US010540001B1

(12) United States Patent
Poupyrev et al.

(10) Patent No.: US 10,540,001 B1
(45) Date of Patent: Jan. 21, 2020

(54) FINE-MOTION VIRTUAL-REALITY OR AUGMENTED-REALITY CONTROL USING RADAR

(71) Applicant: Google Inc., Mountain View, CA (US)

(72) Inventors: Ivan Poupyrev, Sunnyvale, CA (US); Patrick M. Amihood, San Francisco, CA (US)

(73) Assignee: Google LLC, Mountain View, CA (US)

( * ) Notice: Subject to any disclaimer, the term of this patent is extended or adjusted under 35 U.S.C. 154(b) by 44 days.

(21) Appl. No.: 15/287,253

(22) Filed: Oct. 6, 2016

Related U.S. Application Data

(60) Provisional application No. 62/237,975, filed on Oct. 6, 2015.

(51) Int. Cl.
*G06F 3/01* (2006.01)
*G06F 3/0481* (2013.01)

(52) U.S. Cl.
CPC .............. *G06F 3/011* (2013.01); *G06F 3/017* (2013.01); *G06F 3/04815* (2013.01)

(58) Field of Classification Search
CPC ........ G06F 3/011; G06F 3/017; G06F 3/04815
See application file for complete search history.

(56) References Cited

U.S. PATENT DOCUMENTS

| | | |
|---|---|---|
| 3,610,874 A | 10/1971 | Gagliano |
| 3,752,017 A | 8/1973 | Lloyd et al. |
| 3,953,706 A | 4/1976 | Harris et al. |
| 4,104,012 A | 8/1978 | Ferrante |
| 4,654,967 A | 4/1987 | Thenner |
| 4,700,044 A | 10/1987 | Hokanson et al. |
| 4,795,998 A | 1/1989 | Dunbar et al. |
| 4,838,797 A | 6/1989 | Dodier |
| 5,016,500 A | 5/1991 | Conrad et al. |
| 5,121,124 A | 6/1992 | Spivey et al. |
| 5,298,715 A | 3/1994 | Chalco et al. |
| 5,341,979 A | 8/1994 | Gupta |
| 5,410,471 A | 4/1995 | Alyfuku et al. |
| 5,468,917 A | 11/1995 | Brodsky et al. |
| 5,564,571 A | 10/1996 | Zanotti |
| 5,656,798 A | 8/1997 | Kubo et al. |

(Continued)

FOREIGN PATENT DOCUMENTS

| | | |
|---|---|---|
| CN | 1462382 | 12/2003 |
| CN | 101751126 | 6/2010 |

(Continued)

OTHER PUBLICATIONS

"Advisory Action", U.S. Appl. No. 14/504,139, dated Aug. 28, 2017, 3 pages.

(Continued)

*Primary Examiner* — Amr A Awad
(74) *Attorney, Agent, or Firm* — Colby Nipper PLLC

(57) ABSTRACT

This document describes techniques for fine-motion virtual-reality or augmented-reality control using radar. These techniques enable small motions and displacements to be tracked, even in the millimeter or sub-millimeter scale, for user control actions even when those actions are small, fast, or obscured due to darkness or varying light. Further, these techniques enable fine resolution and real-time control, unlike conventional RF-tracking or optical-tracking techniques.

26 Claims, 7 Drawing Sheets

(56) References Cited

U.S. PATENT DOCUMENTS

| | | |
|---|---|---|
| 5,724,707 A | 3/1998 | Kirk et al. |
| 5,798,798 A | 8/1998 | Rector et al. |
| 6,032,450 A | 3/2000 | Blum |
| 6,037,893 A | 3/2000 | Lipman |
| 6,080,690 A | 6/2000 | Lebby et al. |
| 6,101,431 A | 8/2000 | Niwa et al. |
| 6,210,771 B1 | 4/2001 | Post et al. |
| 6,254,544 B1 | 7/2001 | Hayashi |
| 6,313,825 B1 | 11/2001 | Gilbert |
| 6,340,979 B1 | 1/2002 | Beaton et al. |
| 6,380,882 B1 | 4/2002 | Hegnauer |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,833 B2 | 2/2003 | Breed et al. |
| 6,513,970 B1 | 2/2003 | Tabata et al. |
| 6,524,239 B1 | 2/2003 | Reed et al. |
| 6,543,668 B1 | 4/2003 | Fujii et al. |
| 6,616,613 B1 | 9/2003 | Goodman |
| 6,711,354 B2 | 3/2004 | Kameyama |
| 6,717,065 B2 | 4/2004 | Hosaka et al. |
| 6,802,720 B2 | 10/2004 | Weiss et al. |
| 6,833,807 B2 | 12/2004 | Flacke et al. |
| 6,835,898 B2 | 12/2004 | Eldridge et al. |
| 6,854,985 B1 | 2/2005 | Weiss |
| 6,929,484 B2 | 8/2005 | Weiss et al. |
| 6,970,128 B1 | 11/2005 | Dwelly et al. |
| 6,997,882 B1 | 2/2006 | Parker et al. |
| 7,019,682 B1 | 3/2006 | Louberg et al. |
| 7,134,879 B2 | 11/2006 | Sugimoto et al. |
| 7,158,076 B2 | 1/2007 | Fiore et al. |
| 7,164,820 B2 | 1/2007 | Eves et al. |
| 7,194,371 B1 | 3/2007 | McBride et al. |
| 7,205,932 B2 | 4/2007 | Fiore |
| 7,223,105 B2 | 5/2007 | Weiss et al. |
| 7,230,610 B2 | 6/2007 | Jung et al. |
| 7,249,954 B2 | 7/2007 | Weiss |
| 7,266,532 B2 | 9/2007 | Sutton et al. |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,528,082 B2 | 5/2009 | Krans et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,647,093 B2 | 1/2010 | Bojovic et al. |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,791,700 B2 | 9/2010 | Bellamy |
| 7,834,276 B2 | 11/2010 | Chou et al. |
| 7,845,023 B2 | 12/2010 | Swatee |
| 7,941,676 B2 | 5/2011 | Glaser |
| 7,952,512 B1 | 5/2011 | Delker et al. |
| 7,999,722 B2 | 8/2011 | Beeri et al. |
| 8,062,220 B2 | 11/2011 | Kurtz et al. |
| 8,063,815 B2 | 11/2011 | Valo et al. |
| 8,169,404 B1 | 5/2012 | Boillot |
| 8,179,604 B1 | 5/2012 | Prada Gomez et al. |
| 8,193,929 B1 | 6/2012 | Siu et al. |
| 8,199,104 B2 | 6/2012 | Park et al. |
| 8,282,232 B2 | 10/2012 | Hsu et al. |
| 8,289,185 B2 | 10/2012 | Alonso |
| 8,301,232 B2 | 10/2012 | Albert et al. |
| 8,314,732 B2 | 11/2012 | Oswald et al. |
| 8,334,226 B2 | 12/2012 | Nhan et al. |
| 8,341,762 B2 | 1/2013 | Balzano |
| 8,344,949 B2 | 1/2013 | Moshfeghi |
| 8,367,942 B2 | 2/2013 | Howell et al. |
| 8,475,367 B1 | 7/2013 | Yuen et al. |
| 8,505,474 B2 | 8/2013 | Kang et al. |
| 8,509,882 B2 | 8/2013 | Albert et al. |
| 8,514,221 B2 | 8/2013 | King et al. |
| 8,527,146 B1 | 9/2013 | Jackson et al. |
| 8,549,829 B2 | 10/2013 | Song et al. |
| 8,560,972 B2 | 10/2013 | Wilson |
| 8,562,526 B2 | 10/2013 | Heneghan et al. |
| 8,569,189 B2 | 10/2013 | Bhattacharya et al. |
| 8,614,689 B2 | 12/2013 | Nishikawa et al. |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 8,819,812 B1 | 8/2014 | Weber et al. |
| 8,854,433 B1 | 10/2014 | Rafii |
| 8,860,602 B2 | 10/2014 | Nohara et al. |
| 8,921,473 B1 | 12/2014 | Hyman |
| 8,948,839 B1 | 2/2015 | Longinotti-Buitoni et al. |
| 9,055,879 B2 | 6/2015 | Selby et al. |
| 9,075,429 B1 | 7/2015 | Karakotsios et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Zhou et al. |
| 9,223,494 B1 | 12/2015 | Desalvo et al. |
| 9,229,102 B1 | 1/2016 | Wright et al. |
| 9,230,160 B1 | 1/2016 | Kanter |
| 9,235,241 B2 | 1/2016 | Newham et al. |
| 9,316,727 B2 | 4/2016 | Sentelle et al. |
| 9,331,422 B2 | 5/2016 | Nazzaro et al. |
| 9,335,825 B2 | 5/2016 | Rautiainen et al. |
| 9,346,167 B2 | 5/2016 | O'Connor et al. |
| 9,354,709 B1 | 5/2016 | Heller et al. |
| 9,508,141 B2 | 11/2016 | Khachaturian et al. |
| 9,511,877 B2 | 12/2016 | Masson |
| 9,569,001 B2 | 2/2017 | Mistry et al. |
| 9,575,560 B2 | 2/2017 | Poupyrev et al. |
| 9,588,625 B2 | 3/2017 | Poupyrev |
| 9,594,443 B2 | 3/2017 | Vanblon et al. |
| 9,600,080 B2 | 3/2017 | Poupyrev |
| 9,693,592 B2 | 7/2017 | Robinson et al. |
| 9,746,551 B2 | 8/2017 | Scholten et al. |
| 9,766,742 B2 | 9/2017 | Papakostas |
| 9,778,749 B2 | 10/2017 | Poupyrev |
| 9,811,164 B2 | 11/2017 | Poupyrev |
| 9,817,109 B2 | 11/2017 | Saboo et al. |
| 9,837,760 B2 | 12/2017 | Karagozler et al. |
| 9,848,780 B1 | 12/2017 | DeBusschere et al. |
| 9,921,660 B2 | 3/2018 | Poupyrev |
| 9,933,908 B2 | 4/2018 | Poupyrev |
| 9,947,080 B2 | 4/2018 | Nguyen et al. |
| 9,971,414 B2 | 5/2018 | Gollakota et al. |
| 9,971,415 B2 | 5/2018 | Poupyrev et al. |
| 9,983,747 B2 | 5/2018 | Poupyrev |
| 9,994,233 B2 | 6/2018 | Diaz-Jimenez et al. |
| 10,016,162 B1 | 7/2018 | Rogers et al. |
| 10,034,630 B2 | 7/2018 | Lee et al. |
| 10,073,590 B2 | 9/2018 | Dascola et al. |
| 10,080,528 B2 | 9/2018 | DeBusschere et al. |
| 10,082,950 B2 | 9/2018 | Lapp |
| 10,088,908 B1 | 10/2018 | Poupyrev et al. |
| 10,139,916 B2 | 11/2018 | Poupyrev |
| 10,155,274 B2 | 12/2018 | Robinson et al. |
| 10,175,781 B2 | 1/2019 | Karagozler et al. |
| 10,203,763 B1 | 2/2019 | Poupyrev et al. |
| 10,222,469 B1 | 3/2019 | Gillian et al. |
| 10,241,581 B2 | 3/2019 | Lien et al. |
| 10,268,321 B2 | 4/2019 | Poupyrev |
| 10,285,456 B2 | 5/2019 | Poupyrev et al. |
| 10,300,370 B1 | 5/2019 | Amihood et al. |
| 10,310,620 B2 | 6/2019 | Lien et al. |
| 10,310,621 B1 | 6/2019 | Lien et al. |
| 10,379,621 B2 | 8/2019 | Schwesig et al. |
| 10,401,490 B2 | 9/2019 | Gillian et al. |

(56) References Cited

U.S. PATENT DOCUMENTS

| | | |
|---|---|---|
| 10,409,385 B2 | 9/2019 | Poupyrev |
| 10,459,080 B1 | 10/2019 | Schwesig et al. |
| 2001/0035836 A1* | 11/2001 | Miceli .................... G01S 7/412 342/22 |
| 2002/0009972 A1 | 1/2002 | Amento et al. |
| 2002/0080156 A1 | 6/2002 | Abbott et al. |
| 2002/0170897 A1 | 11/2002 | Hall |
| 2003/0005030 A1 | 1/2003 | Sutton et al. |
| 2003/0071750 A1 | 4/2003 | Benitz |
| 2003/0093000 A1 | 5/2003 | Nishio et al. |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0009729 A1 | 1/2004 | Hill et al. |
| 2004/0102693 A1 | 5/2004 | Jenkins |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0128124 A1 | 6/2005 | Greneker et al. |
| 2005/0148876 A1 | 7/2005 | Endoh et al. |
| 2005/0231419 A1 | 10/2005 | Mitchell |
| 2005/0267366 A1 | 12/2005 | Murashita et al. |
| 2006/0035554 A1 | 2/2006 | Glaser et al. |
| 2006/0040739 A1 | 2/2006 | Wells |
| 2006/0047386 A1 | 3/2006 | Kanevsky et al. |
| 2006/0061504 A1 | 3/2006 | Leach, Jr. et al. |
| 2006/0125803 A1 | 6/2006 | Westerman et al. |
| 2006/0136997 A1 | 6/2006 | Telek et al. |
| 2006/0139162 A1 | 6/2006 | Flynn |
| 2006/0139314 A1 | 6/2006 | Bell |
| 2006/0148351 A1 | 7/2006 | Tao et al. |
| 2006/0157734 A1 | 7/2006 | Onodero et al. |
| 2006/0166620 A1 | 7/2006 | Sorensen |
| 2006/0170584 A1 | 8/2006 | Romero et al. |
| 2006/0209021 A1 | 9/2006 | Yoo et al. |
| 2006/0258205 A1 | 11/2006 | Locher et al. |
| 2006/0284757 A1 | 12/2006 | Zemany |
| 2007/0024488 A1 | 2/2007 | Zemany et al. |
| 2007/0026695 A1 | 2/2007 | Lee et al. |
| 2007/0027369 A1 | 2/2007 | Pagnacco et al. |
| 2007/0118043 A1 | 5/2007 | Oliver et al. |
| 2007/0161921 A1 | 7/2007 | Rausch |
| 2007/0164896 A1 | 7/2007 | Suzuki et al. |
| 2007/0176821 A1 | 8/2007 | Flom et al. |
| 2007/0192647 A1 | 8/2007 | Glaser |
| 2007/0197115 A1 | 8/2007 | Eves et al. |
| 2007/0197878 A1 | 8/2007 | Shklarski |
| 2007/0210074 A1 | 9/2007 | Maurer et al. |
| 2007/0237423 A1 | 10/2007 | Tico et al. |
| 2008/0001735 A1 | 1/2008 | Tran |
| 2008/0002027 A1 | 1/2008 | Kondo et al. |
| 2008/0015422 A1 | 1/2008 | Wessel |
| 2008/0024438 A1 | 1/2008 | Collins et al. |
| 2008/0039731 A1 | 2/2008 | McCombie et al. |
| 2008/0059578 A1 | 3/2008 | Albertson et al. |
| 2008/0065291 A1 | 3/2008 | Breed |
| 2008/0074307 A1 | 3/2008 | Boric-Lubecke et al. |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194204 A1 | 8/2008 | Duet et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0278450 A1 | 11/2008 | Lashina |
| 2008/0282665 A1 | 11/2008 | Speleers |
| 2008/0291158 A1 | 11/2008 | Park et al. |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018408 A1 | 1/2009 | Ouchi et al. |
| 2009/0018428 A1 | 1/2009 | Dias et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Den Toonder et al. |
| 2009/0226043 A1 | 9/2009 | Angell et al. |
| 2009/0253585 A1 | 10/2009 | Diatchenko et al. |
| 2009/0270690 A1 | 10/2009 | Roos et al. |
| 2009/0278915 A1 | 11/2009 | Kramer et al. |
| 2009/0288762 A1 | 11/2009 | Wolfel |
| 2009/0295712 A1 | 12/2009 | Ritzau |
| 2009/0319181 A1 | 12/2009 | Khosravy et al. |
| 2010/0045513 A1 | 2/2010 | Pett et al. |
| 2010/0050133 A1 | 2/2010 | Nishihara et al. |
| 2010/0053151 A1 | 3/2010 | Marti et al. |
| 2010/0060570 A1 | 3/2010 | Underkoffler et al. |
| 2010/0065320 A1 | 3/2010 | Urano |
| 2010/0069730 A1 | 3/2010 | Bergstrom et al. |
| 2010/0071205 A1 | 3/2010 | Graumann et al. |
| 2010/0094141 A1 | 4/2010 | Puswella |
| 2010/0109938 A1 | 5/2010 | Oswald et al. |
| 2010/0152600 A1 | 6/2010 | Droitcour et al. |
| 2010/0179820 A1 | 7/2010 | Harrison et al. |
| 2010/0198067 A1 | 8/2010 | Mahfouz et al. |
| 2010/0201586 A1 | 8/2010 | Michalk |
| 2010/0204550 A1 | 8/2010 | Heneghan et al. |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0234094 A1 | 9/2010 | Gagner et al. |
| 2010/0241009 A1 | 9/2010 | Petkie |
| 2010/0002912 A1 | 10/2010 | Solinsky |
| 2010/0281438 A1 | 11/2010 | Latta et al. |
| 2010/0292549 A1 | 11/2010 | Schuler |
| 2010/0306713 A1 | 12/2010 | Geisner et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0018795 A1 | 1/2011 | Jang |
| 2011/0029038 A1 | 2/2011 | Hyde et al. |
| 2011/0073353 A1 | 3/2011 | Lee et al. |
| 2011/0083111 A1 | 4/2011 | Forutanpour et al. |
| 2011/0093820 A1 | 4/2011 | Zhang et al. |
| 2011/0118564 A1 | 5/2011 | Sankai |
| 2011/0119640 A1 | 5/2011 | Berkes et al. |
| 2011/0166940 A1 | 7/2011 | Bangera et al. |
| 2011/0181509 A1 | 7/2011 | Rautiainen et al. |
| 2011/0181510 A1 | 7/2011 | Hakala et al. |
| 2011/0193939 A1 | 8/2011 | Vassigh et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0245688 A1 | 10/2011 | Arora et al. |
| 2011/0279303 A1 | 11/2011 | Smith et al. |
| 2011/0286585 A1 | 11/2011 | Hodge |
| 2011/0303341 A1 | 12/2011 | Meiss et al. |
| 2011/0307842 A1 | 12/2011 | Chiang et al. |
| 2011/0316888 A1 | 12/2011 | Sachs et al. |
| 2011/0318985 A1 | 12/2011 | McDermid |
| 2012/0001875 A1 | 1/2012 | Li et al. |
| 2012/0013571 A1 | 1/2012 | Yeh et al. |
| 2012/0019168 A1 | 1/2012 | Noda et al. |
| 2012/0029369 A1 | 2/2012 | Icove et al. |
| 2012/0047468 A1 | 2/2012 | Santos et al. |
| 2012/0068876 A1 | 3/2012 | Bangera et al. |
| 2012/0092284 A1 | 4/2012 | Rofougaran et al. |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0150493 A1 | 6/2012 | Casey et al. |
| 2012/0154313 A1 | 6/2012 | Au et al. |
| 2012/0156926 A1 | 6/2012 | Kato et al. |

(56) References Cited

U.S. PATENT DOCUMENTS

| | | |
|---|---|---|
| 2012/0174299 A1 | 7/2012 | Balzano |
| 2012/0174736 A1 | 7/2012 | Wang et al. |
| 2012/0182222 A1 | 7/2012 | Moloney |
| 2012/0193801 A1 | 8/2012 | Gross et al. |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0270564 A1 | 10/2012 | Gum et al. |
| 2012/0280900 A1 | 11/2012 | Wang et al. |
| 2012/0298748 A1 | 11/2012 | Factor et al. |
| 2012/0310665 A1 | 12/2012 | Xu et al. |
| 2013/0016070 A1 | 1/2013 | Starner et al. |
| 2013/0027218 A1 | 1/2013 | Schwarz et al. |
| 2013/0035563 A1 | 2/2013 | Angellides |
| 2013/0046544 A1 | 2/2013 | Kay et al. |
| 2013/0053653 A1 | 2/2013 | Cuddihy et al. |
| 2013/0078624 A1 | 3/2013 | Holmes et al. |
| 2013/0082922 A1 | 4/2013 | Miller |
| 2013/0083173 A1 | 4/2013 | Geisner et al. |
| 2013/0086533 A1 | 4/2013 | Stienstra |
| 2013/0096439 A1 | 4/2013 | Lee et al. |
| 2013/0102217 A1 | 4/2013 | Jeon |
| 2013/0104084 A1 | 4/2013 | Mlyniec et al. |
| 2013/0113647 A1 | 5/2013 | Sentelle et al. |
| 2013/0113830 A1 | 5/2013 | Suzuki |
| 2013/0117377 A1 | 5/2013 | Miller |
| 2013/0132931 A1 | 5/2013 | Bruns et al. |
| 2013/0147833 A1 | 6/2013 | Aubauer et al. |
| 2013/0150735 A1 | 6/2013 | Cheng |
| 2013/0161078 A1 | 6/2013 | Li |
| 2013/0169471 A1 | 7/2013 | Lynch |
| 2013/0176161 A1 | 7/2013 | Derham et al. |
| 2013/0194173 A1 | 8/2013 | Zhu et al. |
| 2013/0195330 A1 | 8/2013 | Kim et al. |
| 2013/0196716 A1 | 8/2013 | Khurram |
| 2013/0207962 A1 | 8/2013 | Oberdorfer et al. |
| 2013/0229508 A1 | 9/2013 | Li et al. |
| 2013/0241765 A1 | 9/2013 | Kozma et al. |
| 2013/0245986 A1 | 9/2013 | Grokop et al. |
| 2013/0253029 A1 | 9/2013 | Jain et al. |
| 2013/0260630 A1 | 10/2013 | Ito et al. |
| 2013/0278499 A1 | 10/2013 | Anderson |
| 2013/0278501 A1 | 10/2013 | Bulzacki |
| 2013/0281024 A1 | 10/2013 | Rofougaran et al. |
| 2013/0283203 A1 | 10/2013 | Batraski et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1 | 1/2014 | Frei et al. |
| 2014/0022108 A1 | 1/2014 | Alberth et al. |
| 2014/0028539 A1 | 1/2014 | Newham et al. |
| 2014/0049487 A1 | 2/2014 | Konertz et al. |
| 2014/0050354 A1 | 2/2014 | Heim et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0097979 A1 | 4/2014 | Nohara et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0149859 A1 | 5/2014 | Van Dyken et al. |
| 2014/0184496 A1 | 7/2014 | Gribetz et al. |
| 2014/0184499 A1 | 7/2014 | Kim |
| 2014/0191939 A1 | 7/2014 | Penn et al. |
| 2014/0200416 A1 | 7/2014 | Kashef et al. |
| 2014/0201690 A1* | 7/2014 | Holz .............. G06F 3/017 715/863 |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0247212 A1 | 9/2014 | Kim et al. |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson |
| 2014/0282877 A1 | 9/2014 | Mahaffey et al. |
| 2014/0297006 A1 | 10/2014 | Sadhu |
| 2014/0298266 A1 | 10/2014 | Lapp |
| 2014/0300506 A1 | 10/2014 | Alton et al. |
| 2014/0306936 A1 | 10/2014 | Dahl et al. |
| 2014/0309855 A1 | 10/2014 | Tran |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0329567 A1 | 11/2014 | Chan et al. |
| 2014/0333467 A1 | 11/2014 | Inomata |
| 2014/0343392 A1 | 11/2014 | Yang |
| 2014/0347295 A1 | 11/2014 | Kim et al. |
| 2014/0357369 A1 | 12/2014 | Callens et al. |
| 2014/0368378 A1 | 12/2014 | Crain et al. |
| 2014/0368441 A1 | 12/2014 | Touloumtzis |
| 2014/0376788 A1 | 12/2014 | Xu et al. |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1 | 1/2015 | Driscoll et al. |
| 2015/0030256 A1 | 1/2015 | Brady et al. |
| 2015/0040040 A1 | 2/2015 | Balan et al. |
| 2015/0046183 A1 | 2/2015 | Cireddu |
| 2015/0062033 A1 | 3/2015 | Ishihara |
| 2015/0068069 A1 | 3/2015 | Tran et al. |
| 2015/0077282 A1 | 3/2015 | Mohamadi |
| 2015/0085060 A1 | 3/2015 | Fish et al. |
| 2015/0091820 A1 | 4/2015 | Rosenberg et al. |
| 2015/0091858 A1 | 4/2015 | Rosenberg et al. |
| 2015/0091859 A1 | 4/2015 | Rosenberg et al. |
| 2015/0091903 A1 | 4/2015 | Costello et al. |
| 2015/0095987 A1 | 4/2015 | Potash et al. |
| 2015/0099941 A1 | 4/2015 | Tran |
| 2015/0100328 A1 | 4/2015 | Kress et al. |
| 2015/0106770 A1 | 4/2015 | Shah et al. |
| 2015/0109164 A1 | 4/2015 | Takaki |
| 2015/0112606 A1 | 4/2015 | He et al. |
| 2015/0133017 A1 | 5/2015 | Liao et al. |
| 2015/0143601 A1 | 5/2015 | Longinotti-Buitoni et al. |
| 2015/0145805 A1 | 5/2015 | Liu |
| 2015/0162729 A1 | 6/2015 | Reversat et al. |
| 2015/0177866 A1 | 6/2015 | Hwang et al. |
| 2015/0185314 A1 | 7/2015 | Corcos et al. |
| 2015/0199045 A1 | 7/2015 | Robucci et al. |
| 2015/0205358 A1 | 7/2015 | Lyren |
| 2015/0223733 A1 | 8/2015 | Al-Alusi |
| 2015/0226004 A1 | 8/2015 | Thompson |
| 2015/0229885 A1 | 8/2015 | Offenhaeuser |
| 2015/0256763 A1 | 9/2015 | Niemi |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1 | 10/2015 | Sprenger et al. |
| 2015/0280102 A1 | 10/2015 | Tajitsu et al. |
| 2015/0285906 A1 | 10/2015 | Hooper et al. |
| 2015/0287187 A1 | 10/2015 | Redtel |
| 2015/0301167 A1 | 10/2015 | Sentelle et al. |
| 2015/0312041 A1 | 10/2015 | Choi |
| 2015/0314780 A1 | 11/2015 | Stenneth et al. |
| 2015/0317518 A1 | 11/2015 | Fujimaki et al. |
| 2015/0323993 A1* | 11/2015 | Levesque .......... G02B 27/0172 345/156 |
| 2015/0332075 A1 | 11/2015 | Burch |
| 2015/0341550 A1 | 11/2015 | Lay |
| 2015/0346820 A1 | 12/2015 | Poupyrev et al. |
| 2015/0350902 A1 | 12/2015 | Baxley et al. |

(56) References Cited

U.S. PATENT DOCUMENTS

| | | |
|---|---|---|
| 2015/0351703 A1 | 12/2015 | Phillips et al. |
| 2015/0375339 A1 | 12/2015 | Sterling et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1 | 2/2016 | Poupyrev |
| 2016/0041618 A1 | 2/2016 | Poupyrev |
| 2016/0042169 A1 | 2/2016 | Polehn |
| 2016/0048235 A1 | 2/2016 | Poupyrev |
| 2016/0048236 A1 | 2/2016 | Poupyrev |
| 2016/0048672 A1 | 2/2016 | Lux et al. |
| 2016/0054792 A1 | 2/2016 | Poupyrev |
| 2016/0054803 A1 | 2/2016 | Poupyrev |
| 2016/0054804 A1 | 2/2016 | Gollakata et al. |
| 2016/0055201 A1 | 2/2016 | Poupyrev et al. |
| 2016/0090839 A1 | 3/2016 | Stolarcyzk |
| 2016/0098089 A1 | 4/2016 | Poupyrev |
| 2016/0100166 A1 | 4/2016 | Dragne et al. |
| 2016/0103500 A1 | 4/2016 | Hussey et al. |
| 2016/0106328 A1 | 4/2016 | Mestha et al. |
| 2016/0131741 A1 | 5/2016 | Park |
| 2016/0140872 A1 | 5/2016 | Palmer et al. |
| 2016/0145776 A1 | 5/2016 | Roh |
| 2016/0146931 A1 | 5/2016 | Rao et al. |
| 2016/0170491 A1 | 6/2016 | Jung |
| 2016/0171293 A1 | 6/2016 | Li et al. |
| 2016/0186366 A1 | 6/2016 | McMaster |
| 2016/0206244 A1 | 7/2016 | Rogers |
| 2016/0213331 A1 | 7/2016 | Gil et al. |
| 2016/0216825 A1 | 7/2016 | Forutanpour |
| 2016/0220152 A1 | 8/2016 | Meriheina et al. |
| 2016/0249698 A1 | 9/2016 | Berzowska et al. |
| 2016/0252607 A1 | 9/2016 | Saboo et al. |
| 2016/0252965 A1 | 9/2016 | Mandella et al. |
| 2016/0253044 A1 | 9/2016 | Katz |
| 2016/0259037 A1 | 9/2016 | Molchanov et al. |
| 2016/0262685 A1 | 9/2016 | Wagner et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0287172 A1 | 10/2016 | Morris et al. |
| 2016/0299526 A1 | 10/2016 | Inagaki et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349790 A1 | 12/2016 | Connor |
| 2016/0349845 A1 | 12/2016 | Poupyrev et al. |
| 2016/0377712 A1 | 12/2016 | Wu et al. |
| 2017/0029985 A1 | 2/2017 | Tajitsu et al. |
| 2017/0052618 A1* | 2/2017 | Lee ................... G06F 3/041 |
| 2017/0060254 A1 | 3/2017 | Molchanov et al. |
| 2017/0060298 A1 | 3/2017 | Hwang et al. |
| 2017/0075481 A1 | 3/2017 | Chou et al. |
| 2017/0075496 A1 | 3/2017 | Rosenberg et al. |
| 2017/0097413 A1 | 4/2017 | Gillian et al. |
| 2017/0097684 A1 | 4/2017 | Lien |
| 2017/0115777 A1 | 4/2017 | Poupyrev |
| 2017/0124407 A1 | 5/2017 | Micks et al. |
| 2017/0125940 A1 | 5/2017 | Karagozler et al. |
| 2017/0168630 A1 | 6/2017 | Khoshkava et al. |
| 2017/0192523 A1 | 7/2017 | Poupyrev |
| 2017/0192629 A1 | 7/2017 | Takada et al. |
| 2017/0196513 A1 | 7/2017 | Longinotti-Buitoni et al. |
| 2017/0231089 A1 | 8/2017 | Van Keymeulen |
| 2017/0232538 A1 | 8/2017 | Robinson et al. |
| 2017/0233903 A1 | 8/2017 | Jeon |
| 2017/0249033 A1 | 8/2017 | Podhajny et al. |
| 2017/0322633 A1 | 11/2017 | Shen et al. |
| 2017/0325337 A1 | 11/2017 | Karagozler et al. |
| 2017/0325518 A1 | 11/2017 | Poupyrev et al. |
| 2017/0329412 A1 | 11/2017 | Schwesig et al. |
| 2017/0329425 A1 | 11/2017 | Karagozler et al. |
| 2018/0000354 A1 | 1/2018 | DeBusschere et al. |
| 2018/0000355 A1 | 1/2018 | DeBusschere et al. |
| 2018/0004301 A1 | 1/2018 | Poupyrev |
| 2018/0005766 A1 | 1/2018 | Fairbanks et al. |
| 2018/0046258 A1 | 2/2018 | Poupyrev |
| 2018/0095541 A1 | 4/2018 | Gribetz et al. |
| 2018/0106897 A1 | 4/2018 | Shouldice et al. |
| 2018/0113032 A1 | 4/2018 | Dickey et al. |
| 2018/0157330 A1 | 6/2018 | Gu et al. |
| 2018/0160943 A1 | 6/2018 | Fyfe et al. |
| 2018/0177464 A1 | 6/2018 | DeBusschere et al. |
| 2018/0196527 A1 | 7/2018 | Poupyrev et al. |
| 2018/0256106 A1 | 9/2018 | Rogers et al. |
| 2018/0296163 A1 | 10/2018 | DeBusschere et al. |
| 2018/0321841 A1 | 11/2018 | Lapp |
| 2019/0033981 A1 | 1/2019 | Poupyrev |
| 2019/0138109 A1 | 5/2019 | Poupyrev et al. |
| 2019/0155396 A1 | 5/2019 | Lien et al. |
| 2019/0208837 A1 | 7/2019 | Poupyrev et al. |
| 2019/0232156 A1 | 8/2019 | Amihood et al. |
| 2019/0243464 A1 | 8/2019 | Lien et al. |
| 2019/0257939 A1 | 8/2019 | Schwesig et al. |
| 2019/0278379 A1 | 9/2019 | Gribetz et al. |
| 2019/0321719 A1 | 10/2019 | Gillian et al. |

FOREIGN PATENT DOCUMENTS

| | | |
|---|---|---|
| CN | 102414641 | 4/2012 |
| CN | 102782612 | 11/2012 |
| CN | 102893327 | 1/2013 |
| CN | 202887794 | 4/2013 |
| CN | 103076911 | 5/2013 |
| CN | 103502911 | 1/2014 |
| CN | 102660988 | 3/2014 |
| CN | 104035552 | 9/2014 |
| CN | 103355860 | 1/2016 |
| DE | 102011075725 | 11/2012 |
| DE | 102013201359 | 7/2014 |
| EP | 0161895 | 11/1985 |
| EP | 1785744 | 5/2007 |
| EP | 1815788 | 8/2007 |
| EP | 2417908 | 2/2012 |
| EP | 2637081 | 9/2013 |
| EP | 2770408 | 8/2014 |
| EP | 2953007 | 12/2015 |
| EP | 3201726 | 8/2017 |
| FR | 3017722 | 8/2015 |
| GB | 2070469 | 9/1981 |
| GB | 2443208 | 4/2008 |
| JP | 113860 | 4/1999 |
| JP | 11168268 | 6/1999 |
| JP | 2003280049 | 10/2003 |
| JP | 2006234716 | 9/2006 |
| JP | 2007011873 | 1/2007 |
| JP | 2007132768 | 5/2007 |
| JP | 2008287714 | 11/2008 |
| JP | 2009037434 | 2/2009 |
| JP | 2011102457 | 5/2011 |
| JP | 201218583 | 9/2012 |
| JP | 2012198916 | 10/2012 |
| JP | 2013196047 | 9/2013 |
| JP | 2014532332 | 12/2014 |
| KR | 1020080102516 | 11/2008 |
| KR | 100987650 | 10/2010 |
| KR | 1020140055985 | 5/2014 |
| KR | 101914850 | 10/2018 |
| TW | 201425974 | 7/2014 |
| WO | 9001895 | 3/1990 |
| WO | WO-0130123 | 4/2001 |
| WO | WO-2001027855 | 4/2001 |
| WO | WO-0175778 | 10/2001 |
| WO | WO-2002082999 | 10/2002 |
| WO | 2004004557 | 1/2004 |
| WO | 2004053601 | 6/2004 |
| WO | WO-2005033387 | 4/2005 |
| WO | 2007125298 | 11/2007 |
| WO | WO-2008061385 | 5/2008 |
| WO | WO-2009032073 | 3/2009 |
| WO | 2009083467 | 7/2009 |

(56) References Cited

FOREIGN PATENT DOCUMENTS

| WO | WO-2010032173 | 3/2010 |
|---|---|---|
| WO | 2010101697 | 9/2010 |
| WO | WO-2012026013 | 3/2012 |
| WO | 2012064847 | 5/2012 |
| WO | WO-2012152476 | 11/2012 |
| WO | WO-2013082806 | 6/2013 |
| WO | WO-2013084108 | 6/2013 |
| WO | 2013192166 | 12/2013 |
| WO | WO-2013186696 | 12/2013 |
| WO | WO-2013191657 | 12/2013 |
| WO | WO-2014019085 | 2/2014 |
| WO | 2014085369 | 6/2014 |
| WO | WO-2014116968 | 7/2014 |
| WO | 2014124520 | 8/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015017931 | 2/2015 |
| WO | WO-2015022671 | 2/2015 |
| WO | 2015149049 | 10/2015 |
| WO | 2016053624 | 4/2016 |
| WO | 2016118534 | 7/2016 |
| WO | 2016176471 | 11/2016 |
| WO | 2016178797 | 11/2016 |
| WO | 2017019299 | 2/2017 |
| WO | 2017062566 | 4/2017 |
| WO | 2017200571 | 11/2017 |
| WO | 20170200949 | 11/2017 |
| WO | 2018106306 | 6/2018 |

OTHER PUBLICATIONS

"Final Office Action", U.S. Appl. No. 14/959,901, dated Aug. 25, 2017, 19 pages.
"Final Office Action", U.S. Appl. No. 15/403,066, dated Oct. 5, 2017, 31 pages.
"Non-Final Office Action", U.S. Appl. No. 15/093,533, dated Aug. 24, 2017, 18 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 15/398,147, dated Sep. 8, 2017, 7 pages.
"Non-Final Office Action", U.S. Appl. No. 14/518,863, dated Sep. 29, 2017, 20 pages.
"Non-Final Office Action", U.S. Appl. No. 15/142,689, dated Oct. 4, 2017, 18 pages.
"Pre-Interview Office Action", U.S. Appl. No. 14/862,409, dated Sep. 15, 2017, 16 pages.
"Written Opinion", PCT Application No. PCT/US2016/055671, dated Apr. 13, 2017, 8 pages.
"Written Opinion", PCT Application No. PCT/US2017/032733, dated Jul. 26, 2017, 5 pages.
"Combined Search and Examination Report", GB Application No. 1620891.0, dated May 31, 2017, 9 pages.
"Final Office Action", U.S. Appl. No. 15/398,147, dated Jun. 30, 2017, 11 pages.
"Final Office Action", U.S. Appl. No. 14/874,955, dated Jun. 30, 2017, 9 pages.
"Final Office Action", U.S. Appl. No. 14/959,799, dated Jul. 19, 2017, 12 pages.
"Final Office Action", U.S. Appl. No. 14/504,121, dated Aug. 8, 2017, 16 pages.
"International Search Report and Written Opinion", Application No. PCT/US2016/063874, dated May 11, 2017, 19 pages.
"Non-Final Office Action", U.S. Appl. No. 14/862,409, dated Jun. 22, 2017, 15 pages.

"Non-Final Office Action", U.S. Appl. No. 14/959,730, dated Jun. 23, 2017, 14 pages.
"Notice of Allowance", U.S. Appl. No. 14/513,875, dated Jun. 28, 2017, 7 pages.
"Notice of Allowance", U.S. Appl. No. 15/343,067, dated Jul. 27, 2017, 9 pages.
"Notice of Allowance", U.S. Appl. No. 14/504,038, dated Aug. 7, 2017, 17 pages.
"Notice of Allowance", U.S. Appl. No. 14/494,863, dated May 30, 2017 00:00:00.0, 7 pages.
"Corrected Notice of Allowance", U.S. Appl. No. 14/582,896, dated Feb. 23, 2017, 2 pages.
"International Preliminary Report on Patentability", Application No. PCT/US2015/043963, dated Feb. 16, 2017, 12 pages.
"International Preliminary Report on Patentability", Application No. PCT/US2015/030388, dated Dec. 15, 2016, 12 pages.
"International Preliminary Report on Patentability", Application No. PCT/US2015/043949, dated Feb. 16, 2017, 13 pages.
"International Preliminary Report on Patentability", Application No. PCT/US2015/044774, dated Mar. 2, 2017, 8 pages.
"International Search Report and Written Opinion", Application No. PCT/US2016/062082, dated Feb. 23, 2017, 12 pages.
"International Search Report and Written Opinion", Application No. PCT/US2016/055671, dated Dec. 1, 2016, 14 pages.
"Non-Final Office Action", U.S. Appl. No. 14/513,875, dated Feb. 21, 2017, 9 pages.
"Non-Final Office Action", U.S. Appl. No. 14/874,955, dated Feb. 27, 2017, 8 pages.
"Non-Final Office Action", U.S. Appl. No. 15/398,147, dated Mar. 9, 2017, 10 pages.
"Pre-Interview Communication", U.S. Appl. No. 14/959,730, dated Feb. 15, 2017, 3 pages.
"Corrected Notice of Allowance", U.S. Appl. No. 14/312,486, dated Jan. 23, 2017, 4 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Dec. 19, 2016, 2 pages.
"Non-Final Office Action", U.S. Appl. No. 14/504,121, dated Jan. 9, 2017, 13 pages.
"Non-Final Office Action", U.S. Appl. No. 14/504,139, dated Jan. 27, 2017, 10 pages.
"Non-Final Office Action", U.S. Appl. No. 14/959,799, dated Jan. 27, 2017, 10 pages.
"Notice of Allowance", U.S. Appl. No. 14/930,220, dated Feb. 2, 2017, 8 pages.
"Pre-Interview Communication", U.S. Appl. No. 14/494,863, dated Jan. 27, 2017, 5 pages.
"Pre-Interview Communication", U.S. Appl. No. 14/959,901, dated Feb. 10, 2017, 3 pages.
"Cardiio", Retrieved From: <http://www.cardiio.com/> Apr. 15, 2015 App Information Retrieved From: <https://itunes.apple.com/us/app/cardiio-touchless-camera-pulse/id542891434?ls=1&mt=8> Apr. 15, 2015, Feb. 24, 2015, 6 pages.
"Extended European Search Report", EP Application No. 15170577.9, dated Nov. 5, 2015, 12 pages.
"Final Office Action", U.S. Appl. No. 14/312,486, dated Jun. 3, 2016, 32 pages.
"Final Office Action", U.S. Appl. No. 14/504,038, dated Sep. 27, 2016, 23 pages.
"Final Office Action", U.S. Appl. No. 14/504,061, Mar. 9, 2016, 10 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Search Report and Written Opinion", Application No. PCT/US2015/044774, dated Nov. 3, 2015, 12 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.

(56) References Cited

OTHER PUBLICATIONS

"International Search Report and Written Opinion", Application No. PCT/US2016/032307, dated Aug. 25, 2016, 13 pages.
"International Search Report and Written Opinion", Application No. PCT/US2016/029820, dated Jul. 15, 2016, 14 pages.
"International Search Report and Written Opinion", Application No. PCT/US2016/030177, dated Aug. 2, 2016, 15 pages.
"International Search Report and Written Opinion", Application No. PCT/US2015/043963, dated Nov. 24, 2015, 16 pages.
"International Search Report and Written Opinion", Application No. PCT/US2015/050903, dated Feb. 19, 2016, 18 pages.
"International Search Report and Written Opinion", Application No. PCT/US2016/030115, dated Aug. 8, 2016, 18 pages.
"International Search Report and Written Opinion", Application No. PCT/US2015/043949, dated Dec. 1, 2015, 18 pages.
"Non-Final Office Action", U.S. Appl. No. 14/312,486, dated Oct. 23, 2015, 25 pages.
"Non-Final Office Action", U.S. Appl. No. 14/504,038, dated Feb. 26, 2016, 22 pages.
"Non-Final Office Action", U.S. Appl. No. 14/504,061, dated Nov. 4, 2015, 8 pages.
"Non-Final Office Action", U.S. Appl. No. 14/582,896, dated Jun. 29, 2016, 9 pages.
"Non-Final Office Action", U.S. Appl. No. 14/666,155, dated Aug. 24, 2016, 9 pages.
"Non-Final Office Action", U.S. Appl. No. 14/681,625, dated Aug. 12, 2016, 9 pages.
"Non-Final Office Action", U.S. Appl. No. 14/930,220, dated Sep. 14, 2016, 15 pages.
"Notice of Allowance", U.S. Appl. No. 14/504,061, dated Sep. 12, 2016, 7 pages.
"Philips Vital Signs Camera", Retrieved From: <http://www.vitalsignscamera.com/> Apr. 15, 2015, Jul. 17, 2013, 2 pages.
"Restriction Requirement", U.S. Appl. No. 14/666,155, dated Jul. 22, 2016, 5 pages.
"The Instant Blood Pressure app estimates blood pressure with your smartphone and our algorithm", Retrieved at: http://www.instantbloodpressure.com/—on Jun. 23, 2016, 6 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.
Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.
Espina,"Wireless Body Sensor Network for Continuous Cuff-less Blood Pressure Monitoring", International Summer School on Medical Devices and Biosensors, 2006, Sep. 2006, 5 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
He,"A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.
Holleis,"Evaluating Capacitive Touch Input on Clothes", Proceedings of the 10th International Conference on Human Computer Interaction, Jan. 1, 2008, 10 pages.
Nakajima,"Development of Real-Time Image Sequence Analysis for Evaluating Posture Change and Respiratory Rate of a Subject in Bed", In Proceedings: Physiological Measurement, vol. 22, No. 3 Retrieved From: <http://iopscience.iop.org/0967-3334/22/3/401/pdf/0967-3334_22_3_401.pdf> Feb. 27, 2015, Aug. 2001, 8 pages.
Patel,"Applications of Electrically Conductive Yarns in Technical Textiles", International Conference on Power System Technology (POWECON), Oct. 30, 2012, 6 pages.
Poh,"A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.
Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2Ep, May 7, 2010, 13 pages.
Pu,"Whole-Home Gesture Recognition Using Wireless Signals", MobiCom '13 Proceedings of the 19th annual international conference on Mobile computing & networking, Aug. 27, 2013, 12 pages.
Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhadobov,"Millimeter-wave Interactions with the Human Body: State of Knowledge and Recent Advances", International Journal of Microwave and Wireless Technologies, Mar. 1, 2011, 11 pages.
Zhang,"Study of the Structural Design and Capacitance Characteristics of Fabric Sensor", Advanced Materials Research (vols. 194-196), Feb. 21, 2011, 8 pages.
"Combined Search and Examination Report", GB Application No. 1620892.8, dated Apr. 6, 2017, 5 pages.
"Corrected Notice of Allowance", U.S. Appl. No. 14/930,220, dated Mar. 20, 2017, 2 pages.
"Corrected Notice of Allowance", U.S. Appl. No. 14/930,220, dated May 11, 2017, 2 pages.
"Final Office Action", U.S. Appl. No. 14/518,863, dated May 5, 2017, 18 pages.
"First Action Interview Office Action", U.S. Appl. No. 14/959,901, dated Apr. 14, 2017, 3 pages.
"International Preliminary Report on Patentability", Application No. PCT/US2015/050903, dated Apr. 13, 2017, 12 pages.
"International Search Report and Written Opinion", Application No. PCT/US2016/060399, dated Jan. 30, 2017, 11 pages.
"Non-Final Office Action", U.S. Appl. No. 14/504,038, dated Mar. 22, 2017, 33 pages.
"Non-Final Office Action", U.S. Appl. No. 15/403,066, dated May 4, 2017, 31 pages.
"Pre-Interview Communication", U.S. Appl. No. 15/343,067, dated Apr. 19, 2017, 3 pages.
"Textile Wire Brochure", Retrieved at: http://www.textile-wire.ch/en/home.html, Aug. 7, 2004, 17 pages.
Stoppa,"Wearable Electronics and Smart Textiles: A Critical Review", In Proceedings of Sensors, vol. 14, Issue 7, Jul. 7, 2014, pp. 11957-11992.
"Final Office Action", U.S. Appl. No. 14/959,799, dated Jan. 4, 2018, 17 pages.
"Final Office Action", U.S. Appl. No. 14/959,730, dated Nov. 22, 2017, 16 pages.
"International Search Report and Written Opinion", PCT/US2017/047691, dated Nov. 16, 2017, 13.
"International Search Report and Written Opinion", PCT Application No. PCT/US2017/051663, dated Nov. 29, 2017, 16 pages.
"Non-Final Office Action", U.S. Appl. No. 14/504,121, dated Jan. 2, 2018, 19 pages.
"Non-Final Office Action", U.S. Appl. No. 14/959,901, dated Jan. 8, 2018, 21 pages.

(56) References Cited

OTHER PUBLICATIONS

"Non-Final Office Action", U.S. Appl. No. 14/504,139, dated Oct. 18, 2017, 12 pages.
"Non-Final Office Action", U.S. Appl. No. 15/595,649, dated Oct. 31, 2017, 16 pages.
"Non-Final Office Action", U.S. Appl. No. 14/862,409, dated Dec. 14, 2017, 17 pages.
"Notice of Allowance", U.S. Appl. No. 15/403,066, dated Jan. 8, 2018, 18 pages.
"Notice of Allowance", U.S. Appl. No. 14/874,955, dated Oct. 20, 2017, 7 pages.
"Notice of Allowance", U.S. Appl. No. 15/398,147, dated Nov. 15, 2017, 8 pages.
"Notice of Publication", U.S. Appl. No. 15/703,511, Jan. 4, 2018, 1 page.
"Restriction Requirement", U.S. Appl. No. 15/362,359, dated Jan. 8, 2018, 5 pages.
Bondade, et al., "A linear-assisted DC-DC hybrid power converter for envelope tracking RF power amplifiers", 2014 IEEE Energy Conversion Congress and Exposition (ECCE), IEEE, Sep. 14, 2014, pp. 5769-5773, XP032680873, DOI: 10.1109/ECCE.2014.6954193, Sep. 14, 2014, 5 pages.
Fan, et al., "Wireless Hand Gesture Recognition Based on Continuous-Wave Doppler Radar Sensors", IEEE Transactions on Microwave Theory and Techniques, Plenum, USA, vol. 64, No. 11, Nov. 1, 2016 (Nov. 1, 2016), pp. 4012-4012, XP011633246, ISSN: 0018-9480, DOI: 10.1109/TMTT.2016.2610427, Nov. 1, 2016, 9 pages.
Lien, et al., "Soli: Ubiquitous Gesture Sensing with Millimeter Wave Radar", ACM Transactions on Graphics (TOG), ACM, Us, vol. 35, No. 4, Jul. 11, 2016 (Jul. 11, 2016), pp. 1-19, XP058275791, ISSN: 0730-0301, DOI: 10.1145/2897824.2925953, Jul. 11, 2016, 19 pages.
Martinez-Garcia, et al., "Four-quadrant linear-assisted DC/DC voltage regulator", Analog Integrated Circuits and Signal Processing, Springer New York LLC, US, vol. 88, No. 1, Apr. 23, 2016 (Apr. 23, 2016), pp. 151-160, XP035898949, ISSN: 0925-1030, DOI: 10.1007/S10470-016-0747-8, Apr. 23, 2016, 10 pages.
Skolnik, "CW and Frequency-Modulated Radar", In: "Introduction to Radar Systems", Jan. 1, 1981 (Jan. 1, 1981), McGraw Hill, XP055047545, ISBN: 978-0-07-057909-5 pp. 68-100, p. 95-p. 97, Jan. 1, 1981, 18 pages.
Zheng, et al., "Doppler Bio-Signal Detection Based Time-Domain Hand Gesture Recognition", 2013 IEEE MTT-S International Microwave Workshop Series on RF and Wireless Technologies for Biomedical and Healthcare Applications (IMWS-BIO), IEEE, Dec. 9, 2013 (Dec. 9, 2013), p. 3, XP032574214, DOI: 10.1109/IMWS-BIO.2013.6756200, Dec. 9, 2013, 3 Pages.
"Corrected Notice of Allowance", U.S. Appl. No. 14/312,486, dated Oct. 28, 2016, 4 pages.
"International Search Report and Written Opinion", Application No. PCT/US2016/024289, dated Aug. 25, 2016, 17 pages.
"Non-Final Office Action", U.S. Appl. No. 14/518,863, dated Oct. 14, 2016, 16 pages.
"Notice of Allowance", U.S. Appl. No. 14/312,486, dated Oct. 7, 2016, 15 pages.
"Notice of Allowance", U.S. Appl. No. 14/582,896, dated Nov. 7, 2016, 5 pages.
"Pre-Interview Communication", U.S. Appl. No. 14/513,875, dated Oct. 21, 2016, 3 pages.
Cheng,"Smart Textiles: From Niche to Mainstream", IEEE Pervasive Computing, Jul. 2013, pp. 81-84.
Farringdon,"Wearable Sensor Badge & Sensor Jacket for Context Awareness", Third International Symposium on Wearable Computers, Oct. 1999, 7 pages.
Pu,"Gesture Recognition Using Wireless Signals", Oct. 2014, pp. 15-18.
Schneegass,"Towards a Garment OS: Supporting Application Development for Smart Garments", Wearable Computers, ACM, Sep. 2014, 6 pages.

"Final Office Action", U.S. Appl. No. 15/595,649, dated May 23, 2018, 13 pages.
"Final Office Action", U.S. Appl. No. 15/142,689, dated Jun. 1, 2018, 16 pages.
"Final Office Action", U.S. Appl. No. 14/874,955, dated Jun. 11, 2018, 9 pages.
"Final Office Action", U.S. Appl. No. 14/959,901, dated Jun. 15, 2018, 21 pages.
"Final Office Action", U.S. Appl. No. 15/286,152, dated Jun. 26, 2018, 25 pages.
"Final Office Action", U.S. Appl. No. 15/267,181, dated Jun. 7, 2018, 31 pages.
"Final Office Action", U.S. Appl. No. 14/504,121, dated Jul. 9, 2018, 23 pages.
"Foreign Office Action", Chinese Application No. 201721290290.3, dated Jun. 6, 2018, 3 pages.
"Foreign Office Action", Japanese Application No. 2018-501256, dated Jul. 24, 2018, 11 pages.
"Non-Final Office Action", U.S. Appl. No. 15/586,174, dated Jun. 18, 2018, 7 pages.
"Non-Final Office Action", U.S. Appl. No. 15/286,512, dated Jul. 19, 2018, 15 pages.
"Non-Final Office Action", U.S. Appl. No. 15/142,829, dated Aug. 16, 2018, 15 pages.
"Notice of Allowance", U.S. Appl. No. 15/362,359, dated Aug. 3, 2018, 8 pages.
"Notice of Allowance", U.S. Appl. No. 14/862,409, dated Jun. 6, 2018, 7 pages.
"Notice of Allowance", U.S. Appl. No. 15/142,619, dated Aug. 13, 2018, 9 pages.
"Pre-Interview Communication", U.S. Appl. No. 15/287,359, dated Jul. 24, 2018, 2 pages.
"Final Office Action", U.S. Appl. No. 14/518,863, dated Apr. 5, 2018, 21 pages.
"Final Office Action", U.S. Appl. No. 14/504,139, dated May 1, 2018, 14 pages.
"First Action Interview Office Action", U.S. Appl. No. 15/166,198, dated Apr. 25, 2018, 8 pages.
"Foreign Office Action", European Application No. 16784352.3, dated May 16, 2018, 3 pages.
"Pre-Interview Communication", U.S. Appl. No. 15/362,359, dated May 17, 2018, 4 pages.
"Preliminary Report on Patentability", PCT Application No. PCT/US2016/055671, dated Apr. 10, 2018, 9 pages.
"Written Opinion", PCT Application No. PCT/US2017/032733, dated Jul. 24, 2017, 5 pages.
"Final Office Action", U.S. Appl. No. 15/142,619, dated Feb. 8, 2018, 15 pages.
"Final Office Action", U.S. Appl. No. 15/093,533, dated Mar. 21, 2018, 19 pages.
"First Action Interview Office Action", U.S. Appl. No. 15/286,152, dated Mar. 1, 2018, 5 pages.
"Foreign Office Action", Chinese Application No. 201721290290.3, dated Mar. 9, 2018, 2 pages.
"Non-Final Office Action", U.S. Appl. No. 15/267,181, dated Feb. 8, 2018, 29 pages.
"Non-Final Office Action", U.S. Appl. No. 14/874,955, dated Feb. 8, 2018, 7 pages.
"Notice of Allowance", U.S. Appl. No. 14/959,730, dated Feb. 22, 2018, 8 pages.
"Pre-Interview Communication", U.S. Appl. No. 15/166,198, dated Mar. 8, 2018, 8 pages.
"Pre-Interview First Office Action", U.S. Appl. No. 15/286,152, dated Feb. 8, 2018, 4 pages.
"Apple Watch Used Four Sensors to Detect your Pulse", retrieved from http://www.theverge.com/2014/9/9/6126991 / apple-watch-four-back-sensors-detect-activity on Sep. 23, 2017 as cited in PCT search report for PCT Application No. PCT/US2016/026756 dated Nov. 10, 2017; The Verge, paragraph 1, Sep. 9, 2014, 4 pages.
"Clever Toilet Checks on Your Health", CNN.Com; Technology, Jun. 28, 2005, 2 pages.
"Final Office Action", U.S. Appl. No. 14/681,625, date Dec. 7, 2016, 10 pages.

(56) References Cited

OTHER PUBLICATIONS

"Final Office Action", U.S. Appl. No. 14/731,195, dated Oct. 11, 2018, 12 pages.
"Final Office Action", U.S. Appl. No. 14/715,454, dated Sep. 7, 2017, 14 pages.
"Final Office Action", U.S. Appl. No. 15/286,512, dated Dec. 26, 2018, 15 pages.
"Final Office Action", U.S. Appl. No. 14/720,632, dated Jan. 9, 2018, 18 pages.
"Final Office Action", U.S. Appl. No. 14/715,454, dated Apr. 17, 2018, 19 pages.
"Final Office Action", U.S. Appl. No. 14/599,954, dated Aug. 10, 2016, 23 pages.
"Final Office Action", U.S. Appl. No. 14/699,181, dated May 4, 2018, 41 pages.
"Final Office Action", U.S. Appl. No. 14/715,793, dated Dec. 12, 2017, 7 pages.
"Final Office Action", U.S. Appl. No. 14/809,901, dated Dec. 13, 2018, 7 pages.
"First Action Interview OA", U.S. Appl. No. 14/715,793, dated Jun. 21, 2017, 3 pages.
"First Action Interview Office Action", U.S. Appl. No. 15/142,471, dated Feb. 5, 2019, 29 pages.
"First Action Interview Office Action", U.S. Appl. No. 14/731,195, dated Jun. 21, 2018, 4 pages.
"First Action Interview Pilot Program Pre-Interview Communication", U.S. Appl. No. 14/731,195, dated Aug. 1, 2017, 3 pages.
"First Examination Report", GB Application No. 1621332.4, dated May 16, 2017, 7 pages.
"Foreign Office Action", Chinese Application No. 201580034536.8, dated Oct. 9, 2018.
"Foreign Office Action", KR Application No. 10-2016-7036023, dated Aug. 11, 2017, 10 pages.
"Foreign Office Action", Chinese Application No. 201580036075.8, dated Jul. 4, 2018, 14 page.
"Foreign Office Action", JP App. No. 2016-567813, dated Jan. 16, 2018, 3 pages.
"Foreign Office Action", Korean Application No. 10-2016-7036015, dated Oct. 15, 2018, 3 pages.
"Foreign Office Action", Japanese Application No. 2016-567839, dated Apr. 3, 2018, 3 pages.
"Foreign Office Action", KR Application No. 10-2016-7035397, dated Sep. 20, 2017, 5 pages.
"Foreign Office Action", Korean Application No. 1020187012629, dated May 24, 2018, 6 pages.
"Foreign Office Action", EP Application No. 15170577.9, dated May 30, 2017, 7 pages.
"Foreign Office Action", Korean Application No. 10-2016-7036396, dated Jan. 3, 2018, 7 pages.
"Foreign Office Action", JP Application No. 2016567813, dated Sep. 22, 2017, 8 pages.
"Foreign Office Action", Japanese Application No. 2018021296, dated Dec. 25, 2018, 8 pages.
"Foreign Office Action", EP Application No. 15754323.2, dated Mar. 9, 2018, 8 pages.
"Foreign Office Action", CN Application No. 201580034908.7, dated Jul. 3, 2018, 12 pages.
"International Preliminary Report on Patentability", PCT Application No. PCT/US2017/032733, dated Nov. 29, 2018, 7 pages.
"International Preliminary Report on Patentability", PCT Application No. PCT/US2016/026756, dated Oct. 19, 2017, 8 pages.
"International Search Report and Written Opinion", PCT Application No. PCT/US2016/065295, dated Mar. 14, 2017, 12 pages.
"International Search Report and Written Opinion", Application No. PCT/US2016/042013, dated Oct. 26, 2016, 12 pages.
"International Search Report and Written Opinion", Application No. PCT/US2016/034366, dated Nov. 17, 2016, 13 pages.
"International Search Report and Written Opinion", Application No. PCT/US2016/033342, dated Oct. 27, 2016, 20 pages.

"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 15/596,702, dated Jan. 4, 2019, 10 pages.
"Non-Final Office Action", U.S. Appl. No. 15/287,155, dated Dec. 10, 2018, 12 pages.
"Non-Final Office Action", U.S. Appl. No. 14/666,155, dated Feb. 3, 2017, 12 pages.
"Non-Final Office Action", U.S. Appl. No. 14/809,901, dated May 24, 2018, 13 pages.
"Non-Final Office Action", U.S. Appl. No. 14/720,632, dated Jun. 14, 2017, 16 pages.
"Non-Final Office Action", U.S. Appl. No. 14/715,454, dated Jan. 11, 2018, 16 pages.
"Non-Final Office Action", U.S. Appl. No. 14/599,954, dated Jan. 26, 2017, 16 pages.
"Non-Final Office Action", U.S. Appl. No. 14/599,954, dated Feb. 2, 2016, 17 pages.
"Non-Final Office Action", U.S. Appl. No. 15/286,537, dated Nov. 19, 2018, 18 pages.
"Non-Final Office Action", U.S. Appl. No. 14/720,632, dated May 18, 2018, 20 pages.
"Non-Final Office Action", U.S. Appl. No. 14/699,181, dated Oct. 18, 2017, 33 pages.
"Non-Final Office Action", U.S. Appl. No. 14/681,625, dated Mar. 6, 2017, 7 pages.
"Non-Invasive Quantification of Peripheral Arterial Volume Distensibilitiy and its Non-Lineaer Relationship with Arterial Pressure", Journal of Biomechanics, Pergamon Press, vol. 42, No. 8; as cited in the search report for PCT/US2016/013968 citing the whole document, but in particular the abstract, dated May 29, 2009, 2 pages.
"Notice of Allowance", U.S. Appl. No. 14/599,954, dated May 24, 2017, 11 pages.
"Notice of Allowance", U.S. Appl. No. 14/715,793, dated Jul. 6, 2018, 5 pages.
"Notice of Allowance", U.S. Appl. No. 15/286,495, dated Jan. 17, 2019, 5 pages.
"Notice of Allowance", U.S. Appl. No. 15/595,649, dated Jan. 3, 2019, 5 pages.
"Notice of Allowance", U.S. Appl. No. 14/715,793, dated Dec. 18, 2017, 5 pages.
"Notice of Allowance", U.S. Appl. No. 14/666,155, dated Feb. 20, 2018, 5 pages.
"Notice of Allowance", U.S. Appl. No. 14/666,155, dated Jul. 10, 2017, 7 pages.
"Notice of Allowance", U.S. Appl. No. 14/681,625, dated Jun. 7, 2017, 7 pages.
"Notice of Allowance", U.S. Appl. No. 14/681,625, dated Oct. 23, 2017, 8 pages.
"Notice of Allowance", U.S. Appl. No. 15/142,829, dated Feb. 6, 2019, 8 pages.
"Notice of Allowance", U.S. Appl. No. 14/504,137, dated Feb. 6, 2019, 9 pages.
"Pre-Interview Communication", U.S. Appl. No. 15/142,471, dated Dec. 12, 2018, 3 pages.
"Pre-Interview Communication", U.S. Appl. No. 14/715,793, dated Mar. 20, 2017, 3 pages.
"Pre-Interview Communication", U.S. Appl. No. 14/715,454, dated Apr. 14, 2017, 3 pages.
"Pre-Interview Office Action", U.S. Appl. No. 14/731,195, dated Dec. 20, 2017, 4 pages.
"Preliminary Report on Patentability", PCT Application No. PCT/US2016/065295, dated Jul. 24, 2018, 18 pages.
"Preliminary Report on Patentability", PCT Application No. PCT/US2016/042013, dated Jan. 30, 2018, 7 pages.
"Preliminary Report on Patentability", PCT Application No. PCT/US2016/032307, dated Dec. 7, 2017, 9 pages.
"Pressure-Volume Loop Analysis in Cardiology", retrieved from https://en.wikipedia.org/w/index.php?title=Pressure-volume loop analysis in cardiology&oldid=636928657 on Sep. 23, 2017; Obtained per

(56) References Cited

OTHER PUBLICATIONS link provided in search report from PCT/US2016/01398 dated Jul. 28, 2016, Dec. 6, 2014, 10 pages.
"Restriction Requirement", U.S. Appl. No. 15/462,957, dated Jan. 4, 2019, 6 pages.
"Restriction Requirement", U.S. Appl. No. 15/352,194, dated Feb. 6, 2019, 8 pages.
"The Dash smart earbuds play back music, and monitor your workout", Retrieved from < http://newatlas.com/bragi-dash-tracking-earbuds/30808/>, Feb. 13, 2014, 3 pages.
"Thermofocus No Touch Forehead Thermometer", Technimed, Internet Archive. Dec. 24, 2014. https://web.archive.org/web/20141224070848/http://www.tecnimed.it:80/thermofocus-forehead-thermometer-H1N1-swine-flu.html, Dec. 24, 2018, 4 pages.
"Written Opinion", PCT Application No. PCT/US2016/042013, dated Feb. 2, 2017, 6 pages.
"Written Opinion", PCT Application No. PCT/US2016/026756, dated Nov. 10, 2016, 7 pages.
"Written Opinion", PCT Application No. PCT/US2016/065295, dated Apr. 13, 2018, 8 pages.
"Written Opinion", PCT Application PCT/US2016/013968, dated Jul. 28, 2016, 9 pages.
Antonimuthu, "Google's Project Soli brings Gesture Control to Wearables using Radar", YouTube[online], Available from https://www.youtube.com/watch?v=czJfcgvQcNA as accessed on May 9, 2017; See whole video, especially 6:05-6:35.
Duncan, David P. "Motion Compensation of Synthetic Aperture Radar", Microwave Earth Remote Sensing Laboratory, Brigham Young University, Apr. 15, 2003, 5 pages.
Ishijima, Masa "Unobtrusive Approaches to Monitoring Vital Signs at Home", Medical & Biological Engineering and Computing, Springer, Berlin, DE, vol. 45, No. 11 as cited in search report for PCT/US2016/013968 dated Jul. 28, 2016, Sep. 26, 2007, 3 pages.
Klabunde, Richard E. "Ventricular Pressure-Volume Loop Changes in Valve Disease", Retrieved From <https://web.archive.org/web/20101201185256/http://cvphysiology.com/Heart%20Disease/HD009.htm>, Dec. 1, 2010, 8 pages.
Kubota, Yusuke et al., "A Gesture Recognition Approach by using Microwave Doppler Sensors", IPSJ SIG Technical Report, 2009 (6), Information Processing Society of Japan, Apr. 15, 2010, pp. 1-8, Apr. 15, 2010, 13 pages.
Matthews, Robert J. "Venous Pulse", Retrieved at: http://www.rjmatthewsmd.com/Definitions/venous_pulse.htm—on Nov. 30, 2016, Apr. 13, 2013, 7 pages.
Otto, Chris et al., "System Architecture of a Wireless Body Area Sensor Network for Ubiquitous Health Monitoring", Journal of Mobile Multimedia; vol. 1, No. 4, Jan. 10, 2006, 20 pages.
Palese, et al., "The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, Jan. 1, 2013, pp. 8-12.
Pu, Qifan et al., "Whole-Home Gesture Recognition Using Wireless Signals", MobiCom'13, Sep. 30-Oct. 4, Miami, FL, USA, 2013, 12 pages.
Pu, Qifan et al., "Whole-Home Gesture Recognition Using Wireless Signals", Proceedings of the 19th annual international conference on Mobile computing & networking (MobiCom'13), US, ACM, Sep. 30, 2013, pp. 27-38, Sep. 30, 2013, 12 pages.
Zhadobov, Maxim et al., "Millimeter-Wave Interactions with the Human Body: State of Knowledge and Recent Advances", International Journal of Microwave and Wireless Technologies, p. 1 of 1; Cambridge University Press and the European Microwave Association, 2011; doi:10.1017/S1759078711000122, 2011.
"Corrected Notice of Allowance", U.S. Appl. No. 15/362,359, dated Sep. 17, 2018, 10 pages.
"Final Office Action", U.S. Appl. No. 15/166,198, dated Sep. 27, 2018, 33 pages.
"Non-Final Office Action", U.S. Appl. No. 14/959,901, dated Oct. 11, 2018, 22 pages.
"Non-Final Office Action", U.S. Appl. No. 15/287,308, dated Oct. 15, 2018, 18 pages.
"Non-Final Office Action", U.S. Appl. No. 15/286,152, dated Oct. 19, 2018, 27 pages.
"Non-Final Office Action", U.S. Appl. No. 15/286,837, dated Oct. 26, 2018, 10 pages.
"Non-Final Office Action", U.S. Appl. No. 14/504,139, dated Oct. 5, 2018, 16 pages.
"Notice of Allowance", U.S. Appl. No. 15/142,689, dated Oct. 30, 2018, 9 pages.
"Notice of Allowance", U.S. Appl. No. 14/874,955, dated 4, 2018, 8 pages.
"Notice of Allowance", U.S. Appl. No. 15/287,200, Nov. 6, 2018, 19 pages.
"Notice of Allowance", U.S. Appl. No. 15/595,649, dated Sep. 14, 2018, 8 pages.
"Notice of Allowance", U.S. Appl. No. 15/586,174, dated Sep. 24, 2018, 5 pages.
"Pre-Interview Communication", U.S. Appl. No. 15/286,495, dated Sep. 10, 2018, 4 pages.
"Restriction Requirement", U.S. Appl. No. 15/286,537, dated Aug. 27, 2018, 8 pages.
"Written Opinion", PCT Application No. PCT/US2017/051663, dated Oct. 12, 2018, 8 pages.
Gürbüz, et al., "Detection and Identification of Human Targets in Radar Data", Proc. SPIE 6567, Signal Processing, Sensor Fusion, and Target Recognition XVI, 656701, May 7, 2007, 12 pages.
"Final Office Action", U.S. Appl. No. 14/959,901, dated May 30, 2019, 18 pages.
"Final Office Action", U.S. Appl. No. 15/142,471, dated Jun. 20, 2019, 26 pages.
"Final Office Action", U.S. Appl. No. 16/238,464, dated Jul. 25, 2019, 15 pages.
"First Action Interview Office Action", U.S. Appl. No. 15/917,238, dated Jun. 6, 2019, 6 pages.
"International Preliminary Report on Patentability", PCT Application No. PCT/US2017/051663, dated Jun. 20, 2019, 10 pages.
"Non-Final Office Action", U.S. Appl. No. 15/424,263, dated May 23, 2019, 12 pages.
"Non-Final Office Action", U.S. Appl. No. 15/462,957, dated May 24, 2019, 14 pages.
"Notice of Allowance", U.S. Appl. No. 15/287,308, dated Jul. 17, 2019, 17 Pages.
"Notice of Allowance", U.S. Appl. No. 15/352,194, dated Jun. 26, 2019, 8 pages.
"Notice of Allowance", U.S. Appl. No. 15/287,155, dated Jul. 25, 2019, 7 pages.
"Final Office Action", U.S. Appl. No. 15/287,308, dated Feb. 8, 2019, 23 pages.
"Final Office Action", U.S. Appl. No. 15/287,155, dated Apr. 10, 2019, 11 pages.
"Final Office Action", U.S. Appl. No. 15/286,537, dated Apr. 19, 2019, 21 pages.
"Foreign Office Action", Japanese Application No. 2018501256, dated Feb. 26, 2019, 3 pages.
"Non-Final Office Action", U.S. Appl. No. 15/166,198, dated Feb. 21, 2019, 48 pages.
"Non-Final Office Action", U.S. Appl. No. 15/287,394, dated Mar. 22, 2019, 39 pages.
"Non-Final Office Action", U.S. Appl. No. 16/238,464, dated Mar. 7, 2019, 15 pages.
"Notice of Allowance", U.S. Appl. No. 15/286,152, dated Mar. 5, 2019, 23 pages.
"Notice of Allowance", U.S. Appl. No. 15/286,837, dated Mar. 6, 2019, 7 pages.
"Notice of Allowance", U.S. Appl. No. 15/703,511, dated Apr. 16, 2019, 5 pages.
"Notice of Allowance", U.S. Appl. No. 15/286,512, dated Apr. 9, 2019, 14 pages.
"Pre-Interview Communication", U.S. Appl. No. 15/917,238, dated May 1, 2019, 6 pages.
"Pre-Interview Communication", U.S. Appl. No. 15/703,511, dated Feb. 11, 2019, 5 pages.

(56) References Cited

OTHER PUBLICATIONS

Garmatyuk, et al., "Ultra-Wideband Continuous-Wave Random Noise Arc-SAR", IEEE Transaction on Geoscience and Remote Sensing, vol. 40, No. 12, Dec. 2002, Dec. 2002, 10 pages.

Seisheimer, et al., "A Continuous-Wave (CW) Radar for Gait Analysis", IEEE 2001, 2001, 5 pages.

"Foreign Office Action", Korean Application No. 1020197004803, dated Oct. 14, 2019, 2 pages.

"Foreign Office Action", British Application No. 1621332.4, dated Nov. 6, 2019, 3 pages.

"Foreign Office Action", Japanese Application No. 2018156138, dated Sep. 30, 2019, 3 pages.

"Non-Final Office Action", U.S. Appl. No. 15/596,702, dated Oct. 21, 2019, 21 Pages.

"Notice of Allowance", U.S. Appl. No. 15/424,263, dated Nov. 14, 2019, 10 Pages.

"Final Office Action", U.S. Appl. No. 15/287,394, dated Sep. 30, 2019, 38 Pages.

"Final Office Action", U.S. Appl. No. 15/462,957, dated Nov. 8, 2019, 10 Pages.

"Foreign Office Action", Japanese Application No. 2018501256, dated Oct. 23, 2019, 5 pages.

"Galaxy S4 Air Gesture", Galaxy S4 Guides, https://allaboutgalaxys4.com/galaxy-s4-features-explained/air-gesture/, 4 pages.

"Non-Final Office Action", U.S. Appl. No. 15/286,537, dated Sep. 3, 2019, 28 Pages.

"Non-Final Office Action", U.S. Appl. No. 15/791,044, dated Sep. 30, 2019, 22 Pages.

"Non-Final Office Action", U.S. Appl. No. 16/153,395, dated Oct. 22, 2019, 10 Pages.

"Notice of Allowance", U.S. Appl. No. 15/917,238, dated Aug. 21, 2019, 13 pages.

"Notice of Allowance", U.S. Appl. No. 16/389,402, dated Aug. 21, 2019, 7 Pages.

"Notice of Allowance", U.S. Appl. No. 16/356,748, dated Oct. 17, 2019, 9 Pages.

"Notice of Allowance", U.S. Appl. No. 16/238,464, dated Nov. 4, 2019, 10 Pages.

"Samsung Galaxy S4 Air Gestures", Video from https://www.youtube.com/watch?v=375Hb87yGcg, May 7, 2013.

* cited by examiner

US 10,540,001 B1

FINE-MOTION VIRTUAL-REALITY OR AUGMENTED-REALITY CONTROL USING RADAR

RELATED APPLICATION

This application claims priority under 35 U.S.C. § 119(e) to U.S. Provisional Patent Application Ser. No. 62/237,975, titled "Signal Processing and Gesture Recognition", filed on Oct. 6, 2015, the disclosure of which is incorporated by reference herein in its entirety.

BACKGROUND

Current virtual reality (VR) and augmented reality (AR) often use visual tracking of large-body movements. Visual tracking uses optical or infrared cameras to track major body motions to control a user's VR or AR environment. These cameras, however, suffer from inadequate spatial resolution and sensitivity to light and darkness.

Some VR and AR systems use hand-held controllers. These controllers, however, do not permit the great breadth of control that is often desired to control a VR/AR world, as they are limited by the number and orientation of buttons or inadequate motion-sensing sensors, such as accelerometers. Further, hand-held controllers often are nearly worthless for VR, as in VR it is desirable to know a user's body and hand orientation within the VR world, which hand-held controllers do not provide.

A partial solution to this problem involves radio-frequency (RF) techniques that track a point on a moving object. These current RF techniques, however, struggle to determine small motions without having large, complex, or expensive radar systems due to the resolution of the radar tracking system being constrained by the hardware of the radar system.

SUMMARY

This document describes techniques for fine-motion virtual-reality or augmented-reality control using radar. These techniques enable small motions and displacements to be tracked, even in the millimeter or sub-millimeter scale, for user control actions even when those actions are small, fast, or obscured due to darkness or varying light. Further, these techniques enable fine resolution and real-time control, unlike conventional RF-tracking or optical-tracking techniques.

This summary is provided to introduce simplified concepts concerning fine-motion virtual-reality or augmented-reality control using radar, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for fine-motion virtual-reality or augmented-reality (VR/AR) control using radar are described with reference to the following drawings. The same numbers are used throughout the drawings to reference like features and components.

DETAILED DESCRIPTION

Overview

Techniques are described herein that enable fine-motion VR/AR control using radar. These techniques enable small motions and displacements to be tracked, even in the millimeter or sub-millimeter scale, for user control actions in the VR/AR world.

Consider, for example, a conventional optical or IR camera-enabled tracking system for VR/AR environments. Users often prefer that control in the VR/AR world be in-the-air, or performed without a need for a physical object to be manipulated. Thus, use of a track pad, game controller, mouse, keyboard, and the like are not preferred, as they interfere with the feel of the VR/AR world. Nothing quite pulls a user out of the VR/AR experience as a real-world controller reminding the user that the experience is simulated. Further, use of a real-world controller, even a simple one, requires that the user have such a controller with them to enable that control. Many users do not wish to carry objects for control, especially in an AR environment—users just want it work as is.

Partial solutions to using physical controllers in the VR/AR control involve in-the-air gestures, but current techniques permit only large-body motions, with little ability to make fine-motion control. Further, current techniques can be sensitive to background movements, lighting variances, occlusions, and differences in types of users or their clothing. These partial solutions fail to permit fine control, and, for the VR world, a user represented by these conventional systems will not show finger orientation, finger movement, clothing movement or detail, as the resolution and these conventional optical or IR cameras is simply insufficient.

Consider, in addition to optical tracking techniques, a conventional RF system for tracking motions and objects. The resolution of these conventional RF systems is constrained by their antenna-beam width and bandwidth, both of which are based on the hardware of the conventional radar system. While somewhat better resolution can be obtained through multiple antennas, this increases complexity and cost while increasing lag-time between an action and that action being shown or its control made to the game or VR/AR world. Even with a dozen antennas, the resolution is inferior to a single antenna using the disclosed techniques.

Figure 1:
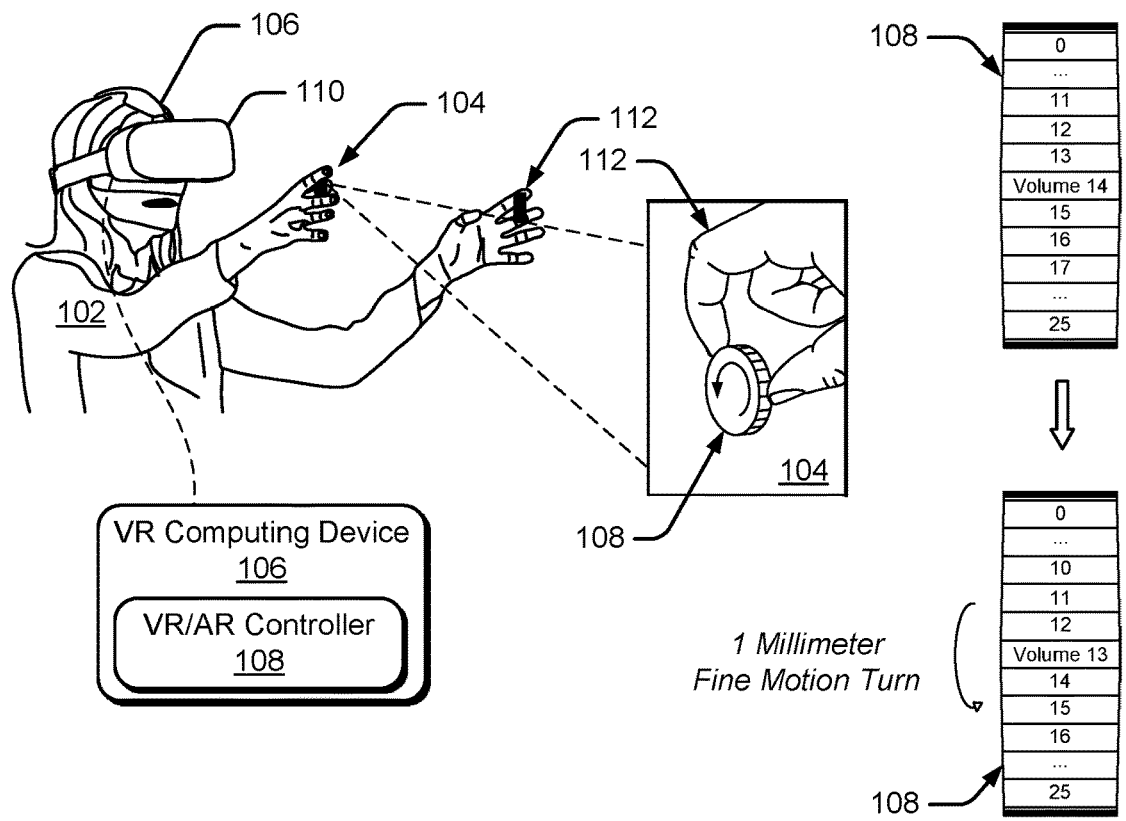
FIG. 1 illustrates two example cases in which fine-motion VR/AR control using radar can be used, in the first example a user performs an in-the-air movement in a virtual world to alter a virtual VR/AR controller, and in the second example a user acts to select virtual buttons in an augmented-reality environment.
Figure 1:
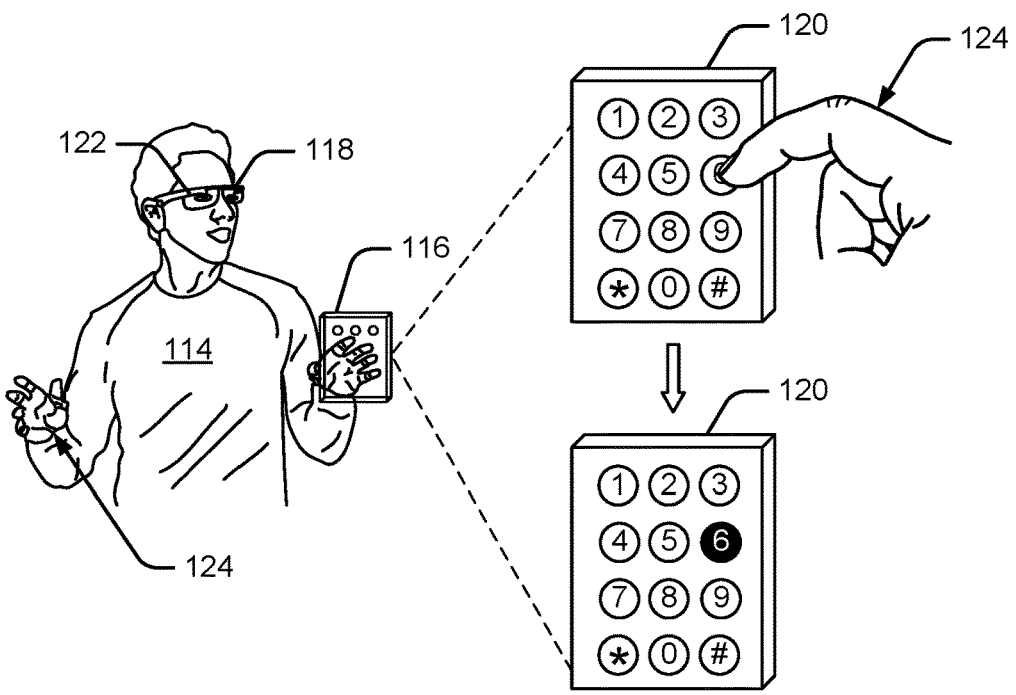

In contrast to these inferior conventional techniques, consider techniques for fine motion VR/AR control using radar, which overcome hardware limitations of conventional radar systems and conventional in-the-air movement recognition. Consider two examples illustrated in FIG. 1. In the first example, a user 102 is using fine-motion control 104 in a virtual-reality game, shown through VR computing device 106. Here the user 102 is manipulating a VR/AR controller 108. The VR/AR controller 108 is illustrated as the user 102 would see it in the virtual game world provided by looking through a VR display 110 (e.g., goggles) of the VR computing device 106. The user's hands 112 are also shown in FIG. 1, though they are shown to the user 102 virtually. Here the user 102 sees his or her fingers turning a small wheel, with the small wheel changing appearance as it is turned. The fine-motion VR/AR techniques show the appearance changes and his or her fingers moving with fine resolution and in real time.

In the second example, a user 114 is using fine-motion control 116 in an augmented-reality environment, shown through AR computing spectacles 118. Here the user 114 is manipulating a VR/AR controller 120. The VR/AR controller 120 is illustrated as the user 114 would see it looking through a viewport 122 of the AR computing spectacles 118. The user's hands 124 are real hands, and thus they are not shown through the viewport 122. Here the user 114 sees his or her real fingers tapping a number pad, with the numbers on the number pad changing color (shown in part) as each is pressed to show that AR environment has correctly received the selections. Assume that the numbers are a phone number, which initiates a phone call through the AR computing spectacles 118, all without needing to touch a real object (many spectacles can make phone calls and include audio output and input, which here is assumed).

This document now turns to an example computing device in which fine-motion VR/AR control using radar can be used, and then follows with an example computing device, an example radio field and occluded portion of a user's hand, a method, example RF wave propagations, and ends with an example computing system.

Example Computing Device

Figure 2:
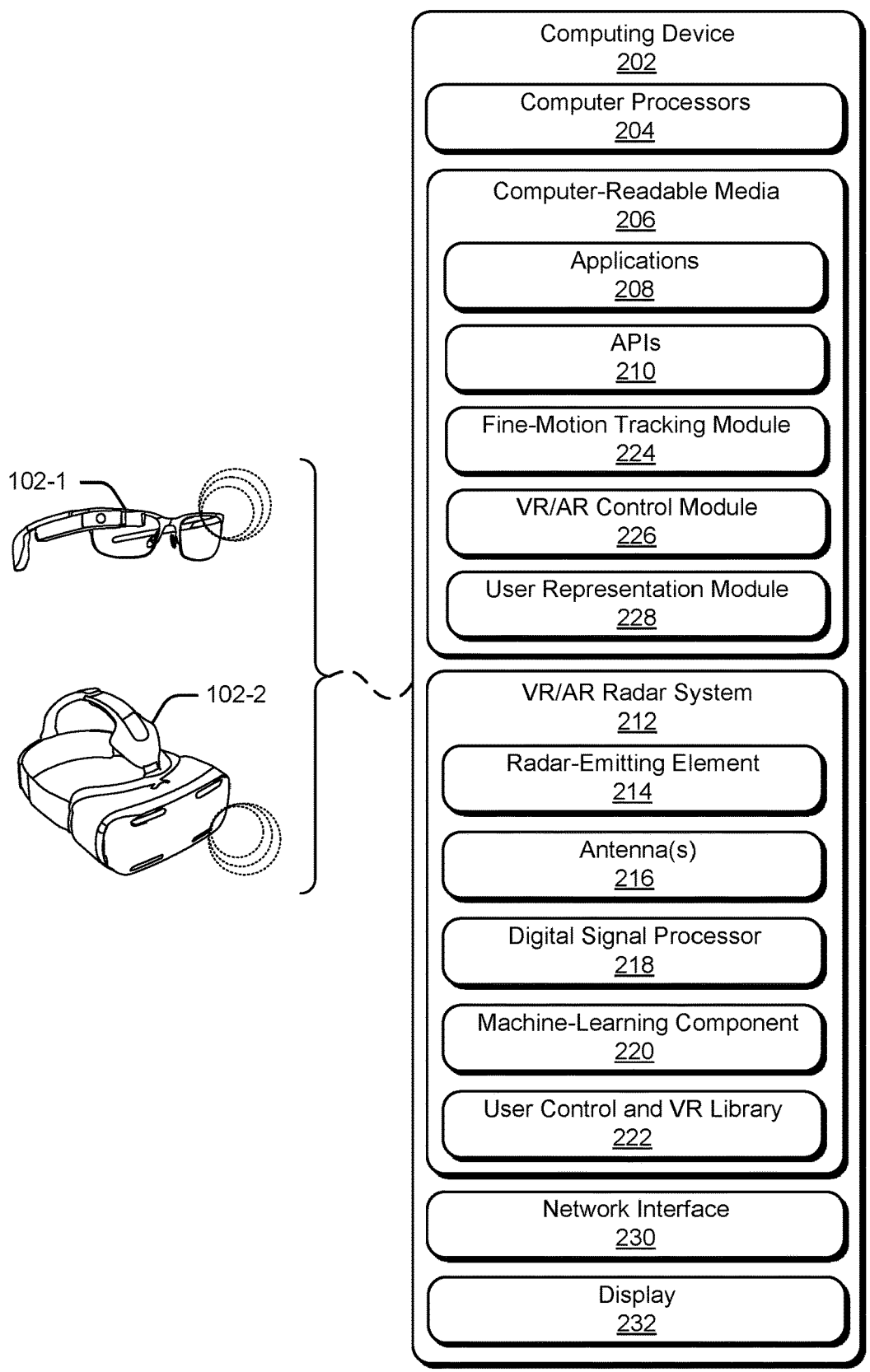
FIG. 2 illustrates an example implementation of the computing devices of FIG. 1 in greater detail, including setting out a radar system and various modules enabling the techniques.

Having generally described example uses of fine motion VR/AR control using radar, now consider FIG. 2, which illustrates an example implementation of the virtual reality computing devices of FIG. 1 in greater detail. Computing device 202 represents any suitable type of computing device in which various embodiments can be implemented. In this example, various devices include, by way of example and not limitation: smart glasses 202-1 and virtual reality goggles 202-2. These are merely examples for illustrative purposes—other suitable type of computing device can be utilized without departing from the scope of the claimed subject matter, such as a laptop, smartphone, smart watch, desktop, netbook, or dedicated gaming console with an appropriate associated VR or AR display.

The computing device 202 includes one or more computer processors 204 and computer-readable media 206. Applications 208 and/or an operating system (not shown) embodied as computer-readable instructions on the computer-readable media 206 can be executed by the processors 204 to invoke or interface with some or all of the functionalities described herein, such as through user control and VR/AR Application Programming Interfaces (APIs) 210. These applications 208 may include game applications, augmented reality programs, or virtual reality programs, through other programs may instead by used, such as to control media, web browsing, and so forth.

The user control and VR/AR APIs 210 (APIs 210) provide programming access into various routines and functionality incorporated into VR/AR radar system 212 (radar system 212). In some embodiments, the APIs 210 provide high-level access into the radar system 212 in order to abstract implementation details and/or hardware access from a calling program, request notifications related to identified events, query for results, and so forth. The APIs 210 can also provide low-level access to the radar system 212, where a calling program can control direct or partial hardware configuration of the radar system 212. In some cases, the APIs 210 provide programmatic access to input configuration parameters that configure transmit signals and/or select VR/AR or user-control recognition algorithms. These APIs enable programs, such as the applications 208, to incorporate the functionality provided by the radar system 212 into executable code. For instance, the applications 208 can call or invoke APIs 210 to register for, or request, an event notification when a particular fine-motion user control has been detected, enable or disable wireless gesture recognition in the computing device 202, and so forth. At times, the APIs 210 can access and/or include low-level hardware drivers that interface with hardware implementations of the radar system 212. Alternately or additionally, the APIs 210 can be used to access various algorithms that reside on the radar system 212 to configure algorithms, extract additional information (such as 3D tracking information, angular extent, reflectivity profiles from different aspects, correlations between transforms/features from different channels), change an operating mode of the radar system 212, and so forth.

The radar system 212 is shown separate from the computer-readable media 206, though it may contain computer-readable instructions. Thus, the radar system 212 can be implemented in part as a chip embedded within the computing device 202, such as a System-on-Chip (SoC), one or more Integrated Circuits (ICs), as a processor with embedded processor instructions, or configured to access processor instructions stored in memory, as hardware with embedded firmware, a printed circuit board with various hardware components, or any combination thereof. Here, the radar system 212 includes a radar-emitting element 214, one or more antennas 216, a digital signal processor 218, a machine-learning component 220, and a user-control and VR/AR library 222. In conjunction with fine-motion tracking module 224, VR/AR VR/AR control module 226, and/or user representation module 228 (each described below), the radar system 212 can enable advanced VR/AR control, even for millimeter-scale movements or small object movement (e.g., fingers, lips, tongue).

Generally, the radar-emitting element 214 is configured to provide a radar field. The radar field is configured to at least partially reflect off a target object. The radar field can also be configured to penetrate fabric or other obstructions and reflect from human tissue. These fabrics or obstructions can include wood, glass, plastic, cotton, wool, nylon and similar fibers, and so forth, while reflecting from human tissues, such as a person's hand. The radar field may also reflect from objects, such as a stylus, finger-worn ring, or bracelet.

A radar field can be a small size, such as 1 millimeter to 15 centimeters, moderate, such as 10 centimeters to 1.5 meters, or moderately large, such as 0.5 to 8 meters (or larger). It is to be appreciated that these sizes are merely for discussion purposes, and that any other suitable range can be used. The radar system 212 and modules 224, 226, or 228 can receive and process reflections of the radar field to provide large-body gestures based on reflections from human tissue caused by body, arm, or leg movements, either alone or in conjunction with small motions. Multiple radar fields can be used, or one field that enables determination of both small and large movements as noted below. Example uses of both large and small motion and position detection include determining a position of a user in three dimensions and large movements for the user, such as arm, leg, or a larger object's position or movement. These, along with small movements, such as fingers and the like, can be combined for realistic VR representations of the user or user control actions, like both moving an arm and rubbing two fingers together.

The antennas 216 receive RF signals. These antennas 216 (or a single antenna) can receive various types of reflections, such as a radar signal representing a superposition of reflections of two or more points within the radar field provided by the radar-emitting element 214 of the radar system 212. Often, a point will be obscured or optically occluded. Example occlusions include food, gloves, clothing, books, other electronic devices, and so forth. Furthermore, often one of these points will be visually obscured. A point on an object is visually obscured with the lighting of that point is dark or otherwise difficult to optically capture, such as when the point is dark relative to at least another of the two or more points or to an ambient lighting of objects within the radar field. Consider, for example, the user 102 of FIG. 1, if he or she were in a dark room, or some part of his or her fingers were shaded or obscured, even by other fingers, they could be difficult to capture optically or in RF with some convention RF techniques.

These antennas 216 can be configured as a dipole antenna, a parabolic antenna, a helical antenna, a monopole antenna, and so forth. In some embodiments, the antennas 216 are constructed on-chip (e.g., as part of an SoC), while in other embodiments, the antennas 216 are separate components, metal, hardware, etc. that attach to, or are included within, the radar system 212. The placement, size, and/or shape of the antennas 212 can be chosen to enhance a specific transmission pattern or diversity scheme, such as a pattern or scheme designed to capture information about a fine-gesture performed by a user's hand.

The digital signal processor 218 generally represents digitally capturing and processing a signal. For instance, the digital signal processor 218 samples analog RF signals received by the antennas 216 to generate digital samples that represent the RF signals, and then processes these samples to extract information about the target object. Alternately or additionally, the digital signal processor 218 controls the configuration of signals generated and transmitted by the radar-emitting element 214 and/or antennas 216, such as configuring a plurality of signals to form a specific diversity scheme like a beamforming diversity scheme. In some cases, the digital signal processor 218 receives input configuration parameters that control an RF signal's transmission parameters (e.g., frequency channel, power level), such as through the APIs 210. In turn, the digital signal processor 218 modifies the RF signal based upon the input configuration parameter. At times, the signal processing functions of the digital signal processor 218 are included in a library of signal processing functions or algorithms that are also accessible and/or configurable via the APIs 210. The digital signal processor 218 can be implemented in hardware, software, firmware, or any combination thereof.

Among other things, the machine-learning component 220 receives information processed or extracted by the digital signal processor 218, and uses that information to classify or recognize various aspects of the target object. In some cases, the machine-learning component 220 applies one or more algorithms to probabilistically determine which gesture has occurred given an input signal and previously learned gesture features. As in the case of the digital signal processor 218, the machine-learning component 220 can include a library of multiple machine-learning algorithms, such as a Random Forrest algorithm, deep-learning algorithms (e.g., artificial neural network algorithms, convolutional neural net algorithms), clustering algorithms, Bayesian algorithms, and so forth. The machine-learning component 220 can be trained on how to identify various gestures using input data that consists of example gesture(s) to learn. In turn, the machine-learning component 220 uses the input data to learn what features can be attributed to a specific gesture. These features are then used to identify when the specific gesture occurs. In some embodiments, the APIs 210 can be used to configure the machine-learning component 220 and/or its corresponding algorithms.

The user control and VR library 222 represents data used by the digital signal processor 218, the machine-learning component 220, and/or modules of FIG. 2, to identify a target object and/or user control actions or movements performed by the target object. For instance, the user control and VR library 222 can store signal characteristics, or characteristics about a target object that are discernable from a signal, such as a particular person's fingers. By so doing, these objects can be tracked and also differentiated from other signals, such as those of a person's arm or hand.

In addition, certain data stored in user control and VR library 222 may be altered before it is stored or used, so that personally identifiable information is removed. For example, a user's identity may be treated so that no personally identifiable information can be determined for the user, or a user's geographic location may be generalized where location information is obtained (such as to a city, postal code, or state/province level), so that a particular location of a user cannot be determined. Thus, the user may have control over what information is collected about the user, how that information is used, and what information is provided to the user.

Generally, the fine-motion tracking module 224 is configured to track one or more points within a radar field effective to track user actions. These actions can be with a virtual object, such as a VR/AR controller. As noted, these tracked user actions include fine-motions in a millimeter or sub-millimeter range. To do so, the fine-motion tracking module 224 may determine displacement or velocity of a point, or a relative displacement or velocity between points, determined from a radar signal representing reflections of one or more points within the radar field. In the case of a single point, the fine-motion tracking module 224 is configured to differentiate the point from other points, and then, based on an energy and velocity of the part of the signal associated with the point, determine a velocity of the point and a displacement if desired. In the case of multiple points, the fine-motion tracking module 224 is configured to determine a relative displacement or velocity between a first and second point of the multiple points. At least one of these points is associated with a user, though another point can be something touched by the user, such as a stylus, or relative to the user, such as an object near or worn by the user. The fine-motion tracking module 224 is able to spatially resolve the first and second points to provide at least a relative velocity or displacement of the points relative to each other or some third point, even if one of those points is obscured or occluded. As noted in part above, the resolving can be at a resolution finer than a wavelength of the radar field provided by the radar system. Thus, as the wavelength is a constraint of the hardware of the system, the techniques described herein overcome that hardware constraint.

In more detail, the fine-motion tracking module 224 may determine a relative displacement by measuring a radial distance for each of the first and second points using a time delay between transmittal of the radar field and receiving the radar signal, measuring a radial velocity through an observed Doppler frequency for each of the first and second points, and measuring a reflected energy for each of the first and second points. This may be performed instead or in conjunction by components of the radar system 212 as well. Assume, for example, that the radar signal includes two sets of data, each set of data from one of two radar emitter-antenna pairs. In such a case, measuring the radial velocity can be through a range-Doppler map for one of the first or second points, per set of data. Also, this relative displacement can be calculated over a time series effective to track the first and second points over multiple relative displacements over time.

The fine-motion tracking module 224 may also, prior to determining the displacement, distinguish the point or points. In some cases this is performed by tracking temporal changes in the radar signal. This distinguishing can be performed by determine a micro-Doppler centroid for each point of interest, respectively. Thus, distinguishing points can be based on one of the first or second point having a different characteristic to a signal associated with the one of the first or second points than another signal associated with another of the first or second points.

In the case of occlusions, the fine-motion tracking module 224 can distinguish points prior to one of the points being optically occluded by tracking the points over time and then determining that one of the points is optically occluded based on an alteration of a characteristic of a signal associated with the optically occluded point. With this alteration known, further distinguishing and tracking can be performed based on the altered characteristic of the signal associated the occluded point. And, when the point that is occluded ceases to be occluded this change to the signal can also be noted, and back and forth. Thus, fingers performing an in-the-air action can be tracked prior to occlusion, then when one finger is occluded by another finger or some object, the controller can track that point as an occluded point based on the altered signal. When that finger is no longer occluded by the other finger or object, the finger is tracked with the alteration no longer preset.

Figure 3:
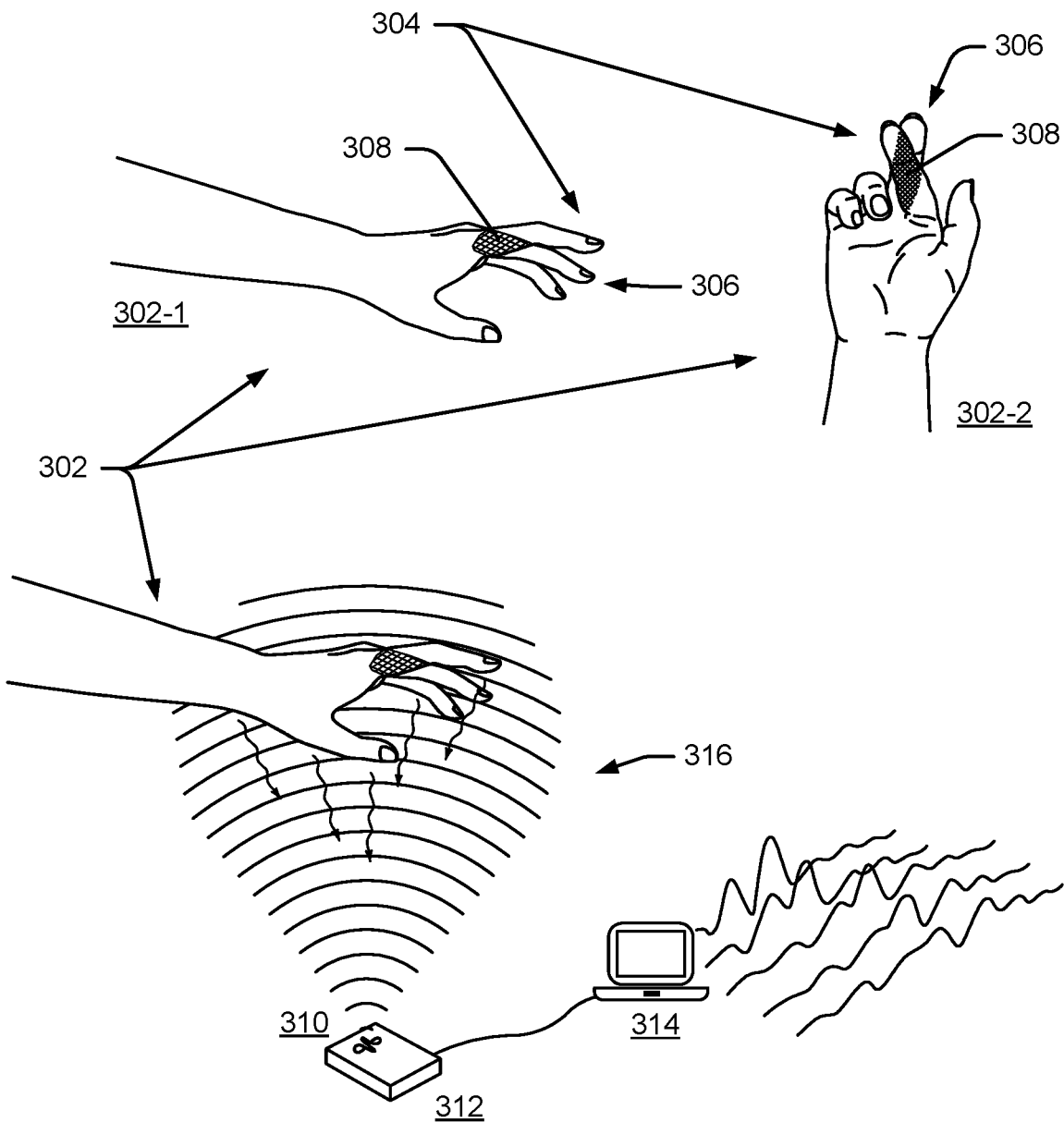
FIG. 3 illustrates a hand acting within a provided radar field, as well as an example radar system and computing device.

Consider, for example, FIG. 3, which illustrates a user's hand 302 (shown in side view 302-1 and bottom view 302-2), an index finger 304, and a middle finger 306. Note that points are reflected in the radar field, and thus the superposition of reflections includes wrist, thumb, finger, palm, and fingertips. This example shows that a portion of a user can be occluded (occluded portion 308) and still tracked, though sometimes no part is occluded. This example also shows an antenna 310 of radar system 312, shown as a peripheral of a computing device 314. The techniques, here through the fine-motion tracking module 224 of FIG. 2, can track any of the parts of the user's hand, even those that are small in size and tracked even to millimeter or sub-millimeter resolutions. Other aspects of FIG. 3 are described in the context of methods discussed below.

Returning to FIG. 2, generally, the VR/AR control module 226 is configured to enable, at least visually, fine-motion control of a VR/AR world using the tracked fine motions of the fine-motion tracking module 224. Thus, while the VR/AR control module 226 may present an object or other control visually for a user to interact with, and even be reactive to the user control, the VR/AR control module 226 does not necessarily cause the control of the VR or AR world. Instead, any of the modules of FIG. 2 may act to cause the control, either through passing the tracking information via APIs or otherwise. In more detail, the VR/AR control module 226 presents a VR/AR controller within a virtual world or augmented-reality viewport and alters an orientation of the VR/AR controller in real time and with fine-motion appearance changes. Returning to FIG. 1, the controller may present the wheel or number pad, and show a user's interactions with it (if VR) or its changes (both VR and AR).

Any of the modules may pass a control input caused by the user action. In some cases this is responsive to the VR/AR controller being moved or altered to a control orientation. Examples include turning a wheel just enough to turn a virtual reality car or a small wheel enough move down a volume on a real-world stereo from 14 volume units to 13 volume units (e.g., see FIG. 1). In other cases it is a binary control orientation, such as pressing a virtual button (e.g., see FIG. 1).

The action that causes the alteration to the VR/AR control can be many different types and sizes, from fine motion, millimeter-scale control of a level or button or wheel, a partially-occluded in-the-air gesture of a hand and fingers, a user slashing with a virtual sword, or even jumping or dodging to avoid a VR game-world snare. The VR/AR control module 226, in some cases, recognizes movements that are previously cataloged or simply determine the motion and pass the motion in a format usable by one of the applications 208 through the APIs 210. A fine motion of sliding a small virtual slider or a large of putting up a virtual shield up to deflect a virtual blow need not be cataloged or a previously known gesture or action. Some actions and movements, however, are known and, in such cases, the VR/AR library 222 is used to determine the particular command or action desired by the movement. Thus, the user control need not be a particular gesture, but may instead by a movement, e.g., that the user 102 has turned a virtual flight simulator control some number of degrees in a direction and then pulled the control toward himself or herself five millimeter for a slight turn and thrust of the virtual plane.

Generally, the user representation module 228 is configured to present, in the virtual world, a portion of a user performing the user actions interacting with the VR/AR controller. This not only allows for fine motions and accurate displacements of a user's actions, but also permits the user to see his or her actions as they change the VR/AR controller, providing valuable feedback. The user representation module 228 may also determine a user's representation based on a displacement or relative displacement of points associated with the user, which may include data that is solely in the millimeter scale but may also include data that is of a larger scale, whether provided by the radar system or other sensing system. Thus, the user representation module 228 may determine fine motions based on displacement or motion from the fine-motion tracking module 224, but may also, from the radar system or even an optical or IR camera, receiving data indicating a user's stance, position, or large motions.

In more detail, the user representation module 228 is configured to determine a location in three dimensions, or relative to a user, for one or more points based on a displacement or relative displacement between points. All of the user's positions of each part of the user can be with fine motion and displacement. In some cases, however, data from another entity that indicates a position of the user may be used. Thus, assume that the user representation module 228 knows a user's general body location of feet, legs, arms, and centroid of a hand (but not detail of the hand) from a lower-resolution system, such as conventional RF techniques. Based on this, the user representation module 228 may place the fingers for the hand based on the fine displacement from the described advanced radar techniques, and well as their fine, real-time movement for the hand With this, the game or VR world is given sufficient information to accurately place the user and the user's fine motions in the game or VR world.

The computing device 202 may also include one or more network interfaces 230 for communicating data over wired, wireless, or optical networks and a display 232. The network interface 230 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like. The display 232 can be integral with the computing device 202 or associated with it, such as with the desktop computer 202-6.

Having described the computing device 202 in accordance with one or more embodiments, now consider example methods for fine motion VR/AR control using radar.

Example Method

Figure 4:
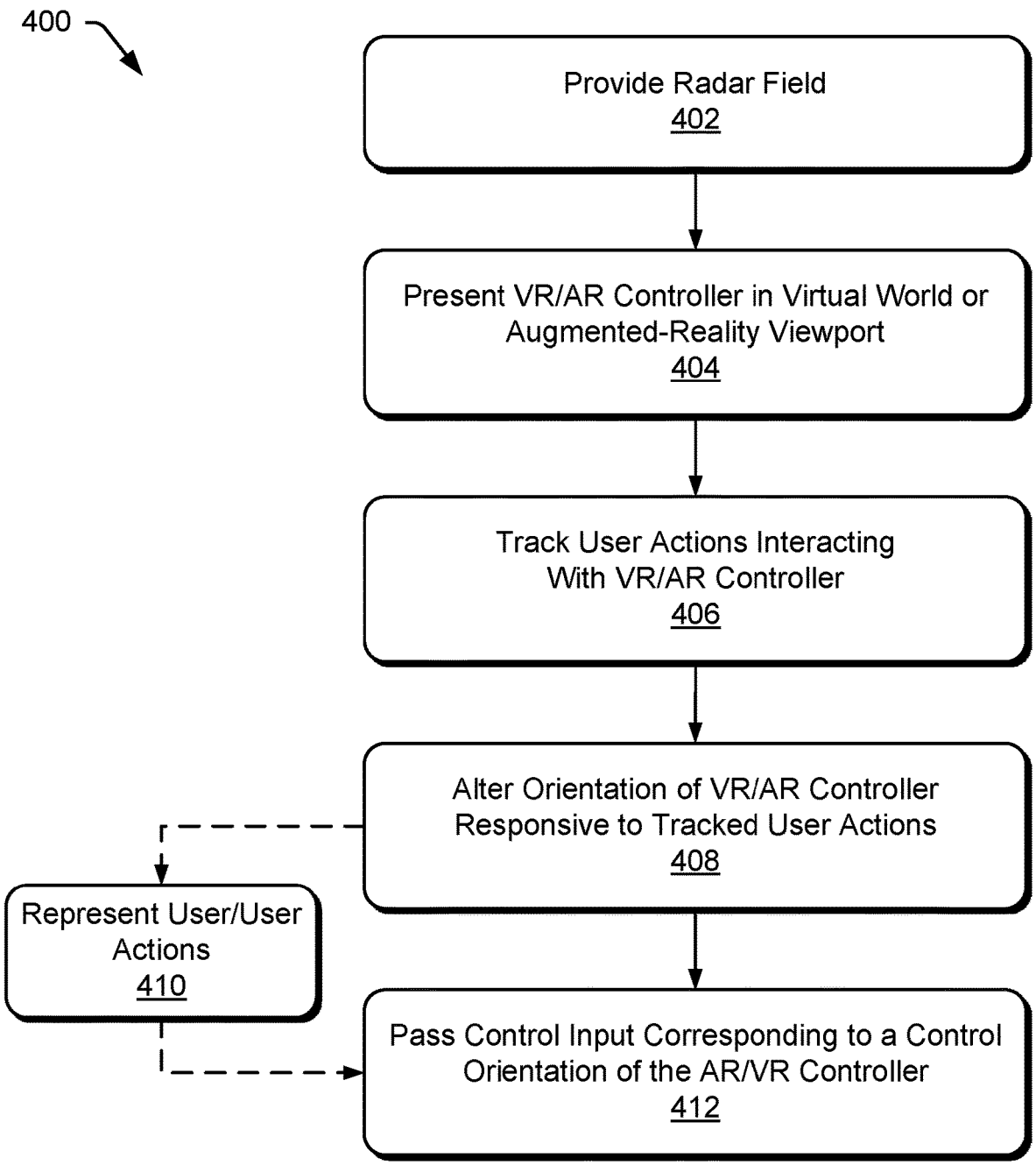
FIG. 4 illustrates an example method for fine-motion VR/AR control using radar.

FIG. 4 depicts a method 400 for fine-motion VR/AR control using radar. This method is shown as sets of blocks that specify operations performed but are not necessarily limited to the order or combinations shown for performing the operations by the respective blocks. In portions of the following discussion reference may be made to FIGS. 1-3 and 5-7, reference to which is made for example only. The techniques are not limited to performance by one entity or multiple entities operating on one device, or those described in these figures.

Figure 5:
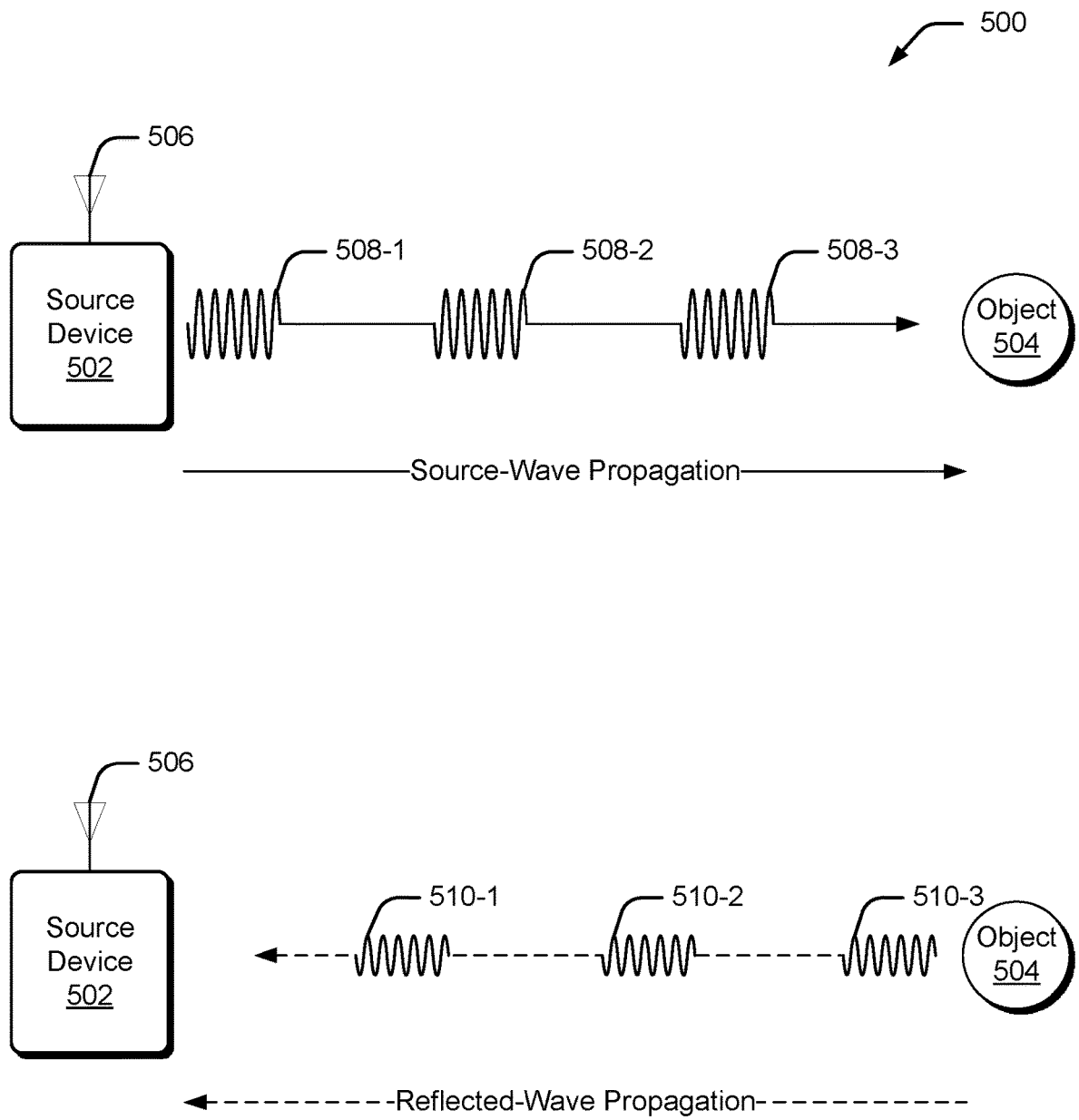
FIG. 5 illustrates a simple example of RF source-wave propagation and a corresponding reflected-wave propagation.

At 402, a radar field is provided, such as shown in FIG. 3 at radar field 316 and FIG. 5. The radar field can be provided by a simple radar system, including existing WiFi radar, and need not use complex, multi-emitter or multi-antenna, or narrow-beam scanning radars. Instead, a broad beam, full contiguous radar field can be used, such as 57-64 or 59-61 GHz, though other frequency bands, even sounds waves, can be used.

At 404, a VR/AR controller is presented within a virtual world or an augmented-reality viewport. This controller can be shown in three or two dimensions, as in some cases a sheet-like two dimensional control can be valuable, such as when various layers of control are desired (e.g., stacked layers of controls). This can be presented prior to, or after receiving some input or movement from a user, such as an in-the-air gesture to select a virtual keyboard or other type of controller be virtually presented.

Figure 6:
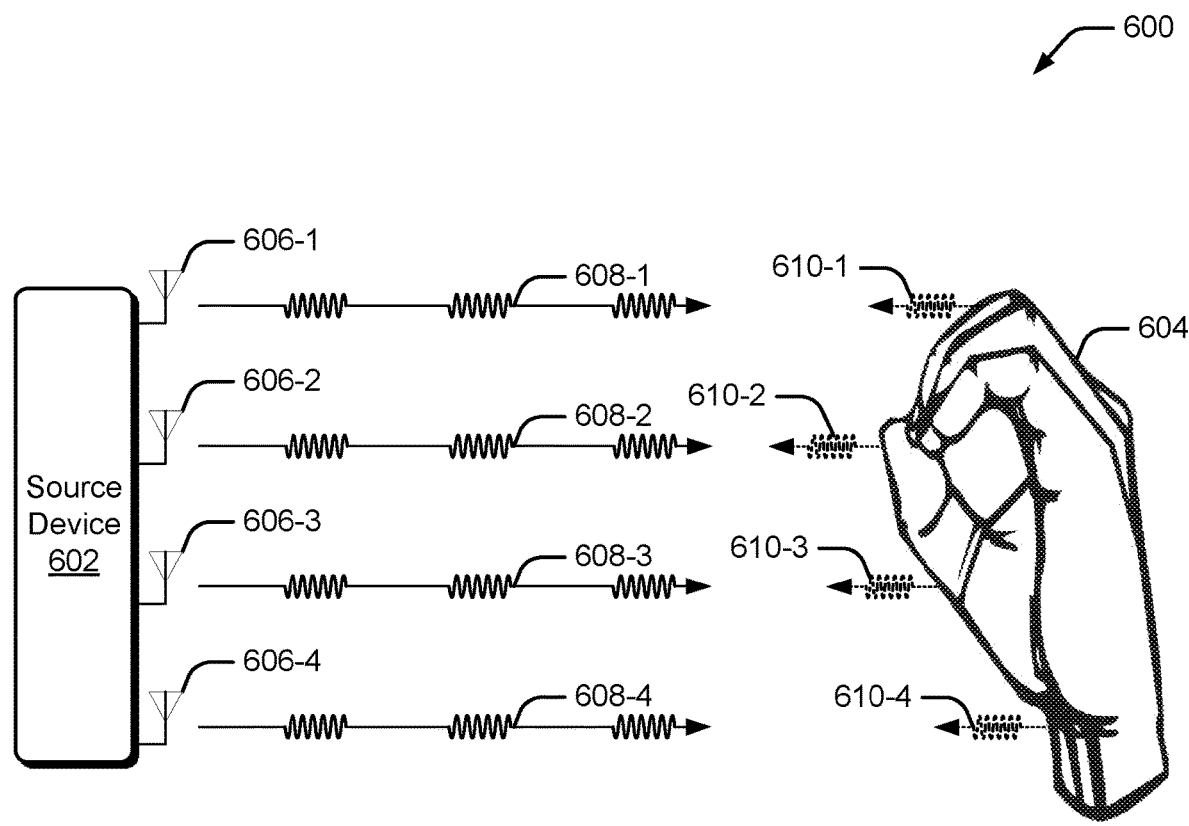
FIG. 6. illustrates an example environment in which multiple antenna are used to receive information about a target object.

At 406, user actions interacting with the VR/AR controller are tracked. These tracked interactions can include fine-motions in a millimeter or sub-millimeter range, though larger motions and displacements can also be tracked. Tracking user actions can be performed in one or more of the many examples provided above. Thus, a radar signal representing a superposition of reflections of points of a user's hand, etc., within the radar field is received. Examples of this are shown in FIG. 3 and FIG. 6.

At 408, an orientation of the VR/AR controller is altered responsive to and corresponding to the tracked user actions. This orientation change can be in many degrees of freedom, from various lateral movements, twists, turns, and so forth, with both velocity and displacement shown. These alterations can be in real time and with fine-motion appearance changes, such as changes in the millimeter or sub-millimeter range. Thus, if a user moves his hand five millimeters right while holding a virtual staff, the VR/AR controller is shown moving that virtual staff five millimeters, and in real time. By so doing, the VR/AR world looks and behaves like the real world.

Optionally, at 410, a user is represented and his or her movements are shown. This is not required in the AR world, though in the VR world this representation makes the virtual world appear more real and responsive. Thus, the VR/AR control module 226 can present the VR/AR controller within the VR world while showing a portion of a user performing the user actions interacting with the VR/AR controller, such as the user's body, hands, and fingers. The representation can be shown in contact with the VR/AR controller, such as is shown in FIG. 1.

At 412, responsive to the altered orientation of the VR/AR controller corresponding to a control orientation, a control input corresponding to the control orientation is passed to an application or entity. This pass of the control input is effective to control the virtual world, the augmented-reality world, or an application or device external to the virtual world or the augment-reality world. Thus, it turns down a real-world stereo, drives a real-world car, or controls a VR or AR game. In some cases this passing is instead simple control of the entity, application, or VR/AR environment.

Through operations of method 400 and as noted above, relative dynamics are extracted from the radar signal representing the superposition of the reflections of multiple points within the radar field. These relative dynamics indicate a displacement of points relative one to another, from which fine-motions and larger movements can be determined, though a single point can also be tracked. As noted above, in some cases extracting relative dynamics from the superposition determines micro-Doppler centroids for the points. These micro-Doppler centroids enable computationally light super-resolution velocity estimates to be determined. Thus, the computational resources needed are relatively low compared to conventional radar techniques, further enabling use of these RF-based fine-motion techniques in small or resource-limited devices, such as some wearable devices and appliances. Not only can these techniques be used on resource-limited devices, but the computationally light determination can permit faster response to a user action, such as in real time as a small, fine motion to move a VR/AR controller.

Further, the RF-based fine-motion techniques, by using micro-Doppler centroids, permits greater robustness to noise and clutter than use of Doppler profile peaks. To increase resolution, the fine-motion tracking module 224 may use the phase change of the radar signal to extract millimeter and sub-millimeter displacements for high-frequency movements of the points.

Example RF Signal Propagation

Having discussed example apparatuses and methods for fine-motion VR/AR control using radar, the discussion now turns to example manners in which RF radar can be used. Consider FIG. 5, which illustrates a simple example of RF source-wave propagation, and a corresponding reflected-wave propagation. The following discussion has been simplified, and is not intended to describe all technical aspects of RF source-wave propagation, reflected-wave propagation, or user actions and representations.

Environment 500 includes a source device 502 and an object 504. The source device 502 includes an emitter/receive antenna 506, which generally represents functionality configured to transmit and receive electromagnetic waves in the form of an RF signal. The emitter/receiver antenna 506 can be coupled to a source, such as a radar-emitting element (e.g., the radar-emitting element 214), to achieve transmission of a signal. In this example, the source device 502 transmits a series of RF pulses, illustrated here as the RF pulse 508-1, the RF pulse 508-2, and the RF pulse 508-3. As indicated by their ordering and distance from the source device 502, the RF pulse 508-3 is transmitted first in time, followed by the RF pulse 508-2, and then the RF pulse 508-1. For discussion purposes, these RF pulses have the same pulse width, power level, and transmission periodicity between pulses, but another suitable type of signal with alternate configurations can be transmitted without departing from the scope of the claimed subject matter.

Generally speaking, electromagnetic waves can be characterized by the frequency or wavelength of their corresponding oscillations. Being a form of electromagnetic radiation, RF signals adhere to various wave and particle properties, such as reflection. When an RF signal reaches an object, it will undergo some form of transition. Specifically, there will be some reflection off the object. The environment 500 also illustrates the reflection of RF pulses 508-1, 2, and 3 reflecting off of the object 504, where an RF pulse 510-1 corresponds to a reflection originating from the RF pulse 508-1 reflecting off of the object 504, the RF pulse 510-2 corresponds to a reflection originating from the RF pulse 508-2, and so forth. In this simple case, the source device 502 and the object 504 are stationary, and the RF pulses 508-1, 2, and 3 are transmitted via a single antenna (the antenna 506) over a same RF channel, and are transmitted directly towards the object 504 with a perpendicular impact angle. Similarly, the RF pulses 510-1, 2, and 3 are shown as reflecting directly back to the source device 502, rather than with some angular deviation. However, as one skilled in the art will appreciate, these signals can alternately be transmitted or reflected with variations in their transmission and reflection directions based upon the configuration of the source device 502, the object 504, transmission parameters, variations in real-world factors, and so forth. Upon receiving and capturing the RF pulses 510-1, 2, and 3, the source device 502 can then analyze the pulses, either individually or in combination, to identify characteristics related to the object 504. For example, the source device 502 can analyze all of the received RF pulses to obtain temporal information and/or spatial information about the object 504. Accordingly, the source device 502 can use knowledge about a transmission signal's configuration (such as pulse widths, spacing between pulses, pulse power levels, phase relationships, and so forth), and further analyze a reflected RF pulse to identify various characteristics about the object 504, such as size, shape, movement speed, movement direction, surface smoothness, material composition, and so forth.

Now consider FIG. 6, which builds upon the above discussion of FIG. 5. FIG. 6 illustrates example environment 600 in which multiple antenna are used to ascertain information about a target object. The environment 600 includes the source device 602 and a target object, shown here as hand 604. Generally speaking, the source device 602 includes antennas 606 to transmit and receive multiple RF signals. In some embodiments, the source device 602 includes the radar system 212 and modules of FIG. 2. The antennas 606 correspond to the antennas 216. While the source device 602 in this example includes four antennas, other suitable number of antennas can be used. Each antenna of the antennas 606 is used by the source device 602 to transmit a respective RF signal (e.g., antenna 606-1 transmits RF signal 608-1, antenna 606-2 transmits RF signal 608-2, and so forth). As discussed above, these RF signals can be configured to form a specific transmission pattern or diversity scheme when transmitted together. For example, the configuration of the RF signals 608, as well as the placement of the antennas 606 relative to a target object, can be based upon beamforming techniques to produce constructive interference or destructive interference patterns, or alternately configured to support triangulation techniques. At times, the source device 602 configures the RF signals 608 based upon an expected information extraction algorithm, as further described below.

When the RF signals 608 reach the hand 604, they generate reflected RF signals 610. Similar to the discussion of FIG. 5 above, the source device 602 captures these reflected RF signals, and then analyzes them to identify various properties or characteristics of the hand 604, such as a millimeter-scale movement. For instance, in this example, the RF signals 608 are illustrated with the bursts of the respective signals being transmitted synchronously in time. In turn, and based upon the shape and positioning of the hand 604, the reflected signals 610 return to the source device 602 at different points in time (e.g., the reflected signal 610-2 is received first, followed by the reflected signal 610-3, then the reflected signal 610-1, and then the reflected signal 610-4). The reflected signals 610 can be received by the source device 602 in any suitable manner. For example, the antennas 606 can each receive all of the reflected signals 610, or receive varying subset combinations of the reflected signals 610 (e.g., the antenna 606-1 receives the reflected signal 610-1 and the reflected signal 610-4, the antenna 606-2 receives the reflected signal 610-1, the reflected signal 610-2, and the reflected signal 610-3, etc.).

Thus, each antenna can receive reflected signals generated by transmissions from another antenna. By analyzing the various return times of each reflected signal, the source device 602 can determine shape and corresponding distance information associated with the hand 604. When reflected pulses are analyzed over time, the source device 602 can additionally discern movement. Thus, by analyzing various properties of the reflected signals, as well as the transmitted signals, various information about the hand 604 can be extracted, as further described below. It is to be appreciated that the above example has been simplified for discussion purposes, and is not intended to be limiting.

As in the case of FIG. 5, FIG. 6 illustrates the RF signals 608 as propagating at a 90° angle from the source device 602 and in phase with one another. Similarly, the reflected signals 610 each propagate back at a 90° angle from the hand 604 and, as in the case of the RF signals 608, are in phase with one another. However, as one skilled in the art will appreciate, more-complex transmission signal configurations, and signal analysis on the reflected signals, can be utilized, examples of which are provided above and below. In some embodiments, the RF signals 608 can each be configured with different directional transmission angles, signal phases, power levels, modulation schemes, RF transmission channels, and so forth. These differences result in variations between the reflected signals 610. In turn, these variations each provide different perspectives of the target object which can be combined using data fusion techniques to yield a better estimate of the hand 604, how it is moving, its three-dimensional (3D) spatial profile, a corresponding user action, and so forth.

Example Computing System

Figure 7:
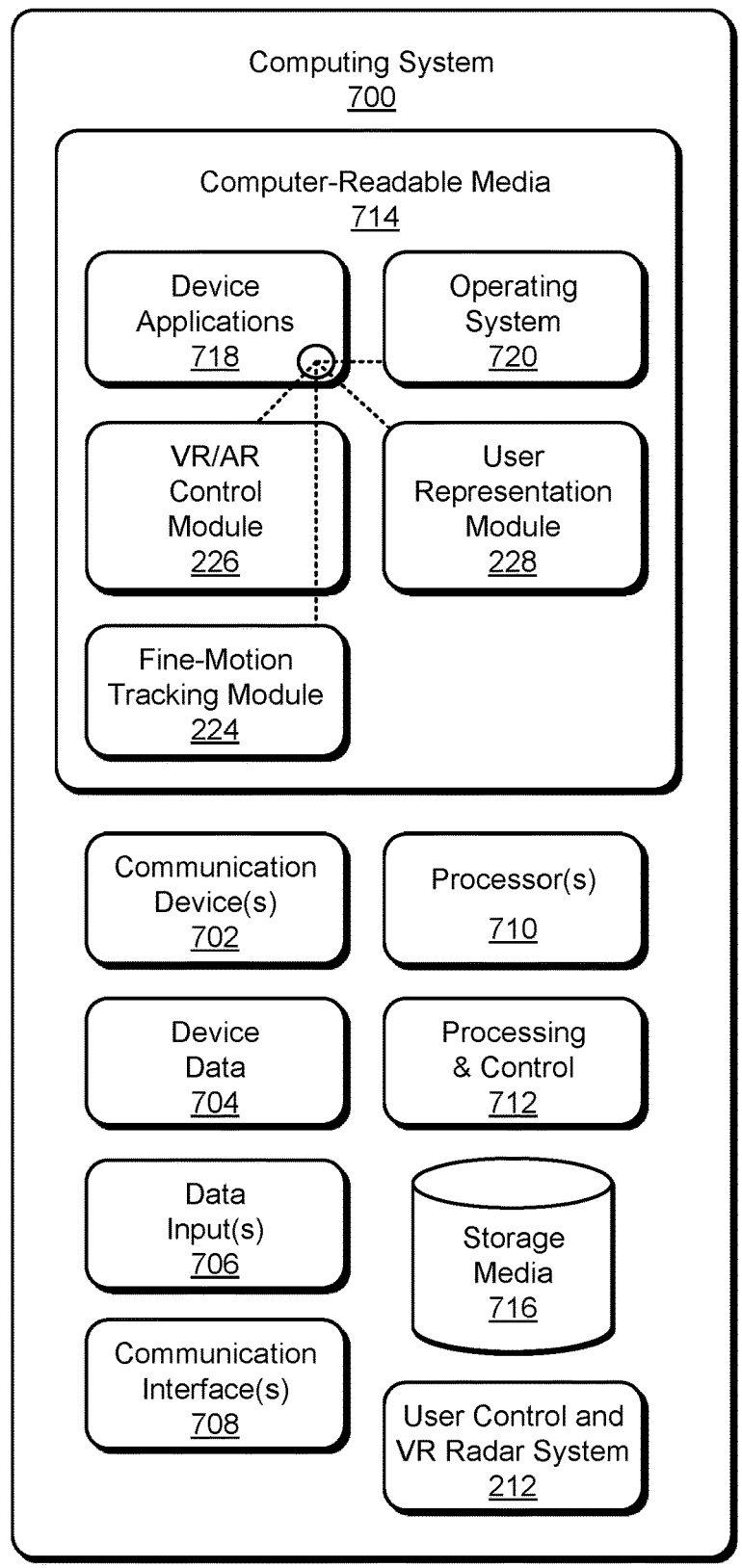
FIG. 7 illustrates an example computing system embodying, or in which techniques may be implemented that enable use of, fine-motion VR/AR control using radar.

FIG. 7 illustrates various components of an example computing system 700 that can be implemented as any type of client, server, and/or computing device as described with reference to the previous FIGS. 1-6 to implement fine-motion VR/AR control using radar.

The computing system 700 includes communication devices 702 that enable wired and/or wireless communication of device data 704 (e.g., received data, data that is being received, data scheduled for broadcast, data packets of the data, etc.). Device data 704 or other device content can include configuration settings of the device, media content stored on the device, and/or information associated with a user of the device (e.g., an identity of an actor performing an action). Media content stored on the computing system 700 can include any type of audio, video, and/or image data. The computing system 700 includes one or more data inputs 706 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

The computing system 700 also includes communication interfaces 708, which can be implemented as any one or more of a serial and/or parallel interface, a wireless interface, any type of network interface, a modem, and as any other type of communication interface. Communication interfaces 708 provide a connection and/or communication links between the computing system 700 and a communication network by which other electronic, computing, and communication devices communicate data with the computing system 700.

The computing system 700 includes one or more processors 710 (e.g., any of microprocessors, controllers, and the like), which process various computer-executable instructions to control the operation of the computing system 700 and to enable techniques for, or in which can be embodied, fine-motion VR/AR control using radar. Alternatively or in addition, the computing system 700 can be implemented with any one or combination of hardware, firmware, or fixed logic circuitry that is implemented in connection with processing and control circuits, which are generally identified at 712. Although not shown, the computing system 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 700 also includes computer-readable media 714, such as one or more memory devices that enable persistent and/or non-transitory data storage (in contrast to mere signal transmission), examples of which include random access memory (RAM), non-volatile memory (e.g., any one or more of a read-only memory (ROM), flash memory, EPROM, EEPROM), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 700 can also include a mass storage media device (storage media) 716 and the user control and VR radar system 212 and its various components.

The computer-readable media 714 provides data storage mechanisms to store the device data 704, as well as various device applications 718 and any other types of information and/or data related to operational aspects of the computing system 700. For example, an operating system 720 can be maintained as a computer application with the computer-readable media 714 and executed on the processors 710. The device applications 718 may include a device manager, such as any form of a control application, software application, signal-processing and control module, code that is native to a particular device, an abstraction module or gesture module and so on. The device applications 718 also include system components, engines, or managers to implement fine-motion VR/AR control using radar, such as the fine-motion tracking module 224, the VR/AR control module 226, and the user representation module 228.

The computing system 700 may also include, or have access to, one or more of radar systems, such as the radar system 212 having the radar-emitting element 214 and the antennas 216. While not shown, one or more components of the fine-motion tracking module 224, the VR/AR control module 226, or the user representation module 228 may be operated, in whole or in part, through hardware or firmware.

CONCLUSION

Although techniques using, and apparatuses including, fine-motion virtual-reality or augmented-reality control using radar have been described in language specific to features and/or methods, it is to be understood that the subject of the appended claims is not necessarily limited to the specific features or methods described. Rather, the specific features and methods are disclosed as example implementations of ways in which to determine fine-motion virtual-reality or augmented-reality control using radar.

We claim:

1. A computer-implemented method for fine-motion virtual-reality or augmented-reality (VR/AR) control, the computer-implemented method comprising:
   presenting a VR/AR controller within a virtual world or an augmented-reality viewport;
   tracking user actions interacting with the VR/AR controller, the tracked interactions including fine-motions in a millimeter or sub-millimeter range, the tracking comprising:
      receiving a radar signal representing a superposition of reflections of two or more points within a radar field provided by a radar-system;
      calculating a radial distance for each of the points using a time delay between a transmittal of the radar field and the receiving of the radar signal;
      calculating a radial velocity for each of the points using an observed Doppler frequency for each of the points;
      ascertaining a reflected energy for each of the points; and
      determining a relative displacement, or a relative velocity, between the points based on the radial distance, radial velocity, and reflected energy for each of the points;
   altering an orientation of the VR/AR controller in real time and with fine-motion appearance changes, the fine-motion appearance changes in the millimeter or sub-millimeter range and corresponding to the tracked user actions; and
   responsive to the altered orientation of the VR/AR controller corresponding to a control orientation, passing a control input corresponding to the control orientation effective to control the virtual world, the augmented-reality world, or an application or device external to the virtual world or the augmented-reality world.

2. The computer-implemented method of claim 1, wherein presenting the VR/AR controller presents the VR/AR controller within the VR world, and further comprising presenting, in the virtual world, a portion of a user performing the user actions interacting with the VR/AR controller.

3. The computer-implemented method of claim 2, wherein presenting the portion of the user presents the portion in real time and in the millimeter or sub-millimeter range.

4. The computer-implemented method of claim 3, wherein presenting the portion of the user shows the portion of the user in contact with the VR/AR controller.

5. The computer-implemented method of claim 1, further comprising distinguishing the points by tracking temporal changes in the radar signal, the distinguishing prior to determining the relative displacement or the relative velocity.

6. The computer-implemented method of claim 1, wherein altering the orientation of the VR/AR controller shows a turn or lateral movement of the VR/AR controller, the turn or the lateral movement shown in real time and corresponding to a real motion in a real world of a velocity and displacement of a portion of a user that performs the user actions.

7. The computer-implemented method of claim 1, wherein the VR/AR controller is presented within the virtual world in three dimensions.

8. The computer-implemented method of claim 1, wherein the VR/AR controller is presented in the augmented-reality viewport, the VR/AR controller presented touching a portion of a user that is performing the user actions.

9. The method of claim 1, wherein the tracked interactions correspond to the relative displacement or relative velocity between the points.

10. The method of claim 1, wherein the points are on one or more hands of a user that performs the user actions.

11. The method of claim 1, wherein a computing device used to perform the method is proximal a head of a user that performs the user actions; and
wherein a display of the computing device presents the VR/AR controller in the virtual world or augmented-reality viewport.

12. An apparatus comprising:
one or more computer processors;
a radar system comprising:
  one or more radar-emitting elements configured to provide a radar field; and
  one or more antenna elements configured to receive a radar signal representing a superposition of reflections of two or more points within the radar field provided by the radar system; and
one or more non-transitory computer-readable storage media having instructions stored thereon that, responsive to execution by one or more computer processors, implement a fine-motion tracking module, a VR/AR control module, and a user representation module:
  the fine-motion tracking module configured to track the points within the radar field effective to track user actions interacting with a VR/AR controller, the tracked user actions including fine-motions in a millimeter or sub-millimeter range, the tracking comprising:
    calculating a radial distance for each of the points using a time delay between a transmittal of the radar field and the receiving of the radar signal;
    calculating a radial velocity for each of the points using an observed Doppler frequency for each of the points;
    ascertaining a reflected energy for each of the points;
    determining a relative displacement, or relative velocity, between the points based on the radial distance, radial velocity, and reflected energy for each of the points, at least one of the points being a portion of a user that performs the user actions;
  the VR/AR control module configured to:
    present the VR/AR controller within a virtual world; and
    alter an orientation of the VR/AR controller in real time and with fine-motion appearance changes, the fine-motion appearance changes in the millimeter or sub-millimeter range and corresponding to the tracked user actions; and
  the user representation module configured to present, in the virtual world, the portion of the user performing the user actions interacting with the VR/AR controller.

13. The apparatus of claim 12, wherein the user representation module presents the portion of the user in real time and in the millimeter or sub-millimeter range.

14. The apparatus of claim 13, the user representation module presents the portion of the user showing the portion of the user in contact with the VR/AR controller and in real time.

15. The apparatus of claim 12, wherein the user representation module presents the portion of the user by determining a location in three dimensions for the user actions.

16. The apparatus of claim 12, wherein the fine-motion tracking module is further configured, responsive to the altered orientation of the VR/AR controller corresponding to a control orientation, to pass a control input corresponding to the control orientation effective to control the virtual world.

17. The apparatus of claim 12, wherein the tracking further comprises distinguishing the points by tracking temporal changes in the radar signal.

18. The apparatus of claim 12, wherein the points are on one or more hands of the user.

19. The apparatus of claim 12, wherein the apparatus is proximal a head of the user; and
wherein the apparatus further comprises a display that presents the VR/AR controller within the virtual world.

20. An apparatus comprising:
one or more computer processors;
a radar system comprising:
  one or more radar-emitting elements configured to provide a radar field; and
  one or more antenna elements configured to receive a radar signal representing a superposition of reflections of two or more points that are spatially separated within the radar field provided by the radar system; and
one or more non-transitory computer-readable storage media having instructions stored thereon that, responsive to execution by one or more computer processors, implement a fine-motion tracking module and a VR/AR control module:
  the fine-motion tracking module configured to track the points within the radar field effective to track user actions interacting with a VR/AR controller, the tracked user actions including fine-motions in a millimeter or sub-millimeter range, the tracking comprising:

distinguishing the spatially separated points by determining respective micro-Doppler centroids for the points; and determining a relative displacement, or relative velocity, between the points by spatially resolving the points, at least one of the points being a portion of a user that performs the user actions;

the VR/AR control module configured to:

present the VR/AR controller within a viewport for an augmented-reality world; and alter an orientation of the VR/AR controller in real time and with fine-motion appearance changes, the fine-motion appearance changes in the millimeter or sub-millimeter range and corresponding to the tracked user actions.

21. The apparatus of claim 20, wherein altering the orientation of the VR/AR controller shows a turn or lateral movement of the VR/AR controller, the turn or the lateral movement shown in real time and corresponding to a real motion in a real world of a velocity and displacement of a portion of the user that performs the user actions.

22. The apparatus of claim 20, wherein the VR/AR controller is presented touching the portion of the user in the real world that is performing the user actions.

23. The apparatus of claim 20, responsive to the altered orientation of the VR/AR controller corresponding to a control orientation, passing a control input corresponding to the control orientation effective to control the augmented-reality viewport.

24. The apparatus of claim 20, wherein the spatially resolving is based on:

a radial distance for each of the points using a time delay between transmittal of the radar field and receiving the radar signal, a radial velocity for each of the points using an observed Doppler frequency, and a reflected energy for each of the first and second points.

25. The apparatus of claim 20, wherein the points are on one or more hands of the user.

26. The apparatus of claim 20, wherein the apparatus is proximal a head the user; and wherein the apparatus further comprises a display that presents the VR/AR controller within the augmented-reality world.

* * * * *